(12) United States Patent
Hirayama et al.

(10) Patent No.: US 11,543,554 B2
(45) Date of Patent: Jan. 3, 2023

(54) EMBEDDED-OBJECT SCANNER DEVICE

(71) Applicant: MAKITA CORPORATION, Anjo (JP)

(72) Inventors: Toshiro Hirayama, Anjo (JP); Hajime Takeuchi, Anjo (JP); Hikaru Sunabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 219 days.

(21) Appl. No.: 16/800,143

(22) Filed: Feb. 25, 2020

(65) Prior Publication Data

US 2020/0271814 A1 Aug. 27, 2020

(30) Foreign Application Priority Data

Feb. 26, 2019 (JP) ............................. JP2019-032710
Feb. 26, 2019 (JP) ............................. JP2019-032711

(51) Int. Cl.
*G01V 3/12* (2006.01)
*G06F 1/16* (2006.01)

(52) U.S. Cl.
CPC .............. *G01V 3/12* (2013.01); *G06F 1/1637* (2013.01)

(58) Field of Classification Search
CPC .......... G01V 3/088; G01V 3/165; G01V 1/00; G01V 3/02; G01S 13/88; G01S 7/03
See application file for complete search history.

(56) References Cited

U.S. PATENT DOCUMENTS

| | | | | |
|---|---|---|---|---|
| 6,894,508 | B2 * | 5/2005 | Sanoner | G01V 3/15 324/67 |
| 8,981,781 | B2 * | 3/2015 | Haldner | G01V 3/165 324/329 |
| 2004/0107017 | A1 | 6/2004 | Hoffmann et al. | |
| 2005/0078303 | A1 | 4/2005 | Murray | |
| 2005/0194959 | A1 * | 9/2005 | Miller | G01V 3/088 324/67 |
| 2008/0186010 | A1 | 8/2008 | Skultety-Betz et al. | |
| 2008/0238403 | A1 * | 10/2008 | Sanoner | G01V 3/15 324/67 |
| 2009/0225159 | A1 | 9/2009 | Schneider et al. | |

(Continued)

FOREIGN PATENT DOCUMENTS

| | | |
|---|---|---|
| JP | S6130782 A | 2/1986 |
| JP | H09288188 A | 11/1997 |

(Continued)

OTHER PUBLICATIONS

English translation of Search Report from the Japanese Patent Office dated Sep. 30, 2022, in counterpart Japanese application No. 2019-032710.

(Continued)

*Primary Examiner* — Nelson M Rosario
(74) *Attorney, Agent, or Firm* — J-Tek Law PLLC; Jeffrey D. Tekanic; Scott T. Wakeman

(57) ABSTRACT

An embedded-object scanner device includes a sensing device housed in a housing and configured to sense one or more embedded objects embedded in a target material, and a display device provided on the housing. The display device is configured to collectively display multiple sets of display data generated in multiple sensing operations performed by the sensing device.

21 Claims, 17 Drawing Sheets

(56) References Cited

U.S. PATENT DOCUMENTS

| | | |
|---|---|---|
| 2010/0097212 A1 | 4/2010 | Wingate et al. |
| 2013/0043872 A1 | 2/2013 | Haldner et al. |
| 2013/0182167 A1 | 7/2013 | Haldner et al. |
| 2014/0139348 A1 | 5/2014 | Wingate et al. |
| 2017/0131426 A1 | 5/2017 | Sgarz et al. |
| 2017/0153350 A1 | 6/2017 | Krapf et al. |
| 2017/0248727 A1 | 8/2017 | Nguyen et al. |

FOREIGN PATENT DOCUMENTS

| | | |
|---|---|---|
| JP | H1020030 A | 1/1998 |
| JP | 2005518549 A | 6/2005 |
| JP | 2009503477 A | 1/2009 |
| JP | 2012506055 A | 3/2012 |
| JP | 2013024872 A | 2/2013 |
| JP | 2013024873 A | 2/2013 |
| JP | 2013070504 A | 4/2013 |
| JP | 2015169556 A | 9/2015 |
| JP | 2016052185 A | 4/2016 |
| JP | 2016099125 A | 5/2016 |
| JP | 2017000196 A | 1/2017 |
| JP | 2017532528 A | 11/2017 |
| JP | 2017532529 A | 11/2017 |
| JP | 2017215185 A | 12/2017 |

OTHER PUBLICATIONS

English translation of Search Report from the Japanese Patent Office dated Sep. 30, 2022, in counterpart Japanese application No. 2019-032711.

Office Action from the Japanese Patent Office dated Oct. 11, 2022, in counterpart Japanese application No. 2019-032710, and machine translation thereof.

Office Action from the Japanese Patent Office dated Nov. 8, 2022, in counterpart Japanese application No. 2019-032711, and machine translation thereof.

\* cited by examiner

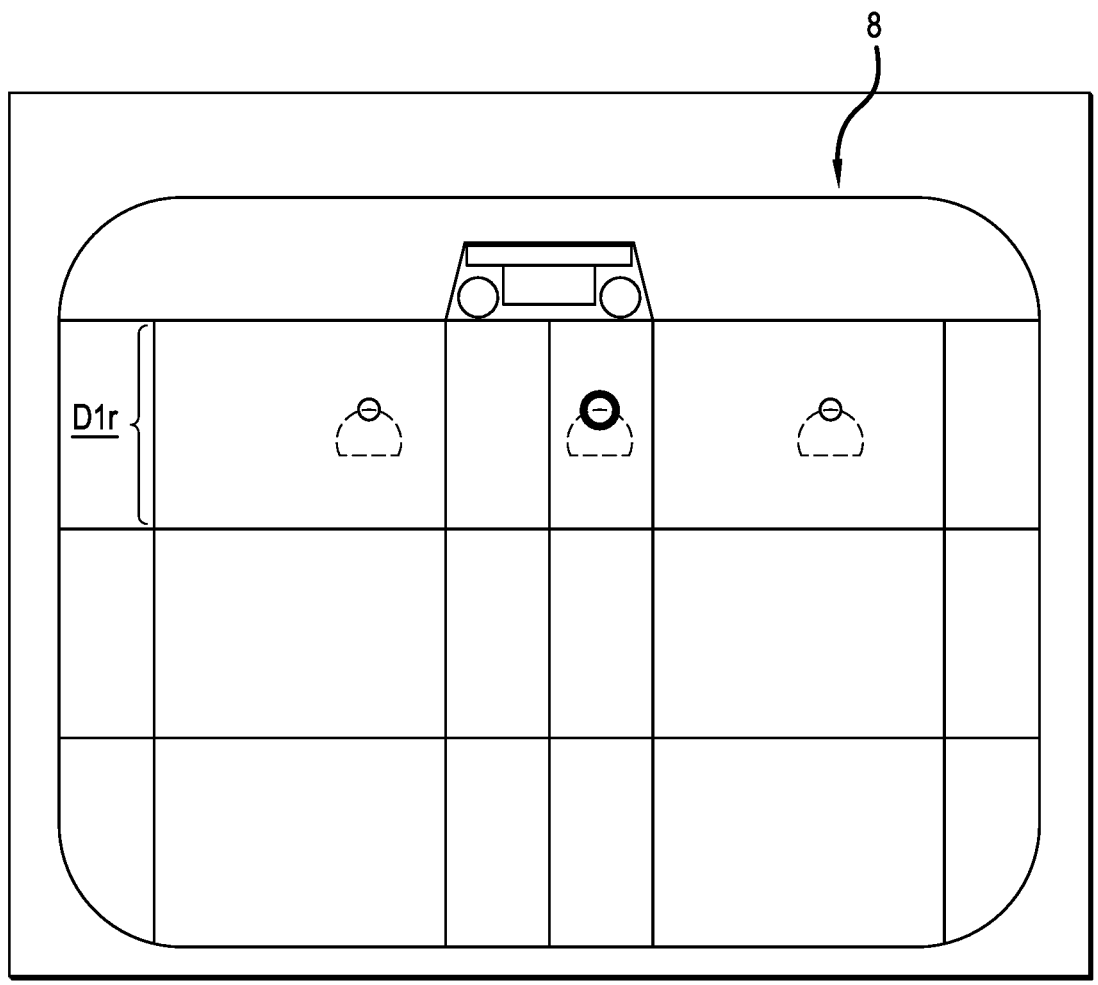
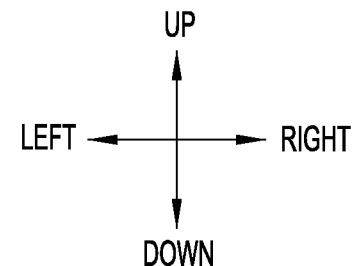
FIG.13

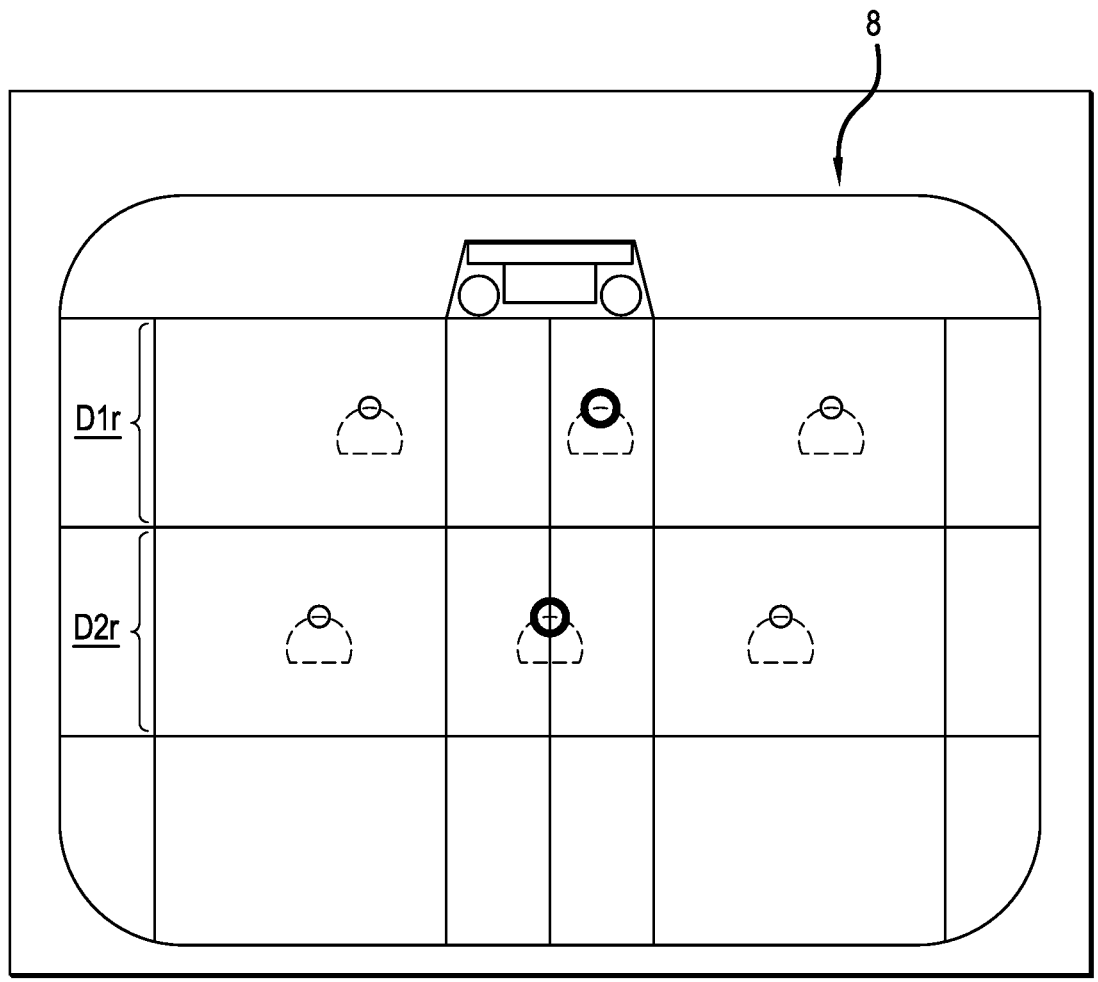
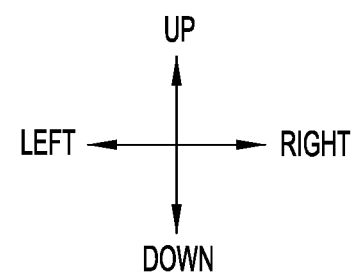
FIG.14

EMBEDDED-OBJECT SCANNER DEVICE

CROSS-REFERENCE

The present application claims priority to Japanese patent application serial numbers 2019-032710 and 2019-032711 filed on Feb. 26, 2019, the contents of which are incorporated fully herein by reference.

TECHNICAL FIELD

The present invention relates to an embedded-object scanner device, which is also known as a wall scanner.

BACKGROUND ART

Japanese Laid-open Patent Publication No. 2017-215185 and US Patent Publication No. 2017/0248727 disclose embedded-object scanner devices (wall scanners) that scan for embedded objects, such as rebar or nails, embedded in a target material, such as concrete, wood, ceramic or drywall.

SUMMARY OF THE INVENTION

To scan for embedded objects using an embedded-object scanner device, it might be necessary for a user to perform a sensing operation multiple times. However, to more easily perform such scanning work, there is demand for a technique that enables the user to efficiently (conveniently) check sensed data generated by the multiple sensing operations.

It is therefore a non-limiting object of the present teachings to disclose a technique that enables such scanning work to be performed more easily/conveniently.

According to one aspect of the present teachings, an embedded-object scanner device (wall scanner) may comprise: a housing; a sensing device, which is housed in the housing and senses one or more embedded objects embedded in a target material; and a display device, which is provided on the housing and collectively displays multiple sets of display data generated in multiple sensing operations performed by the sensing device, thereby enabling the sensed data to be checked by the user more efficiently and conveniently.

According to another aspect of the present teachings, an embedded-object scanner device (wall scanner) may comprise: a housing; a sensing device, which is housed in the housing and senses one or more embedded objects embedded in a target material; and an illumination device, which is provided on the housing and illuminates at least a portion of the surface of the target material, thereby enabling the scanning work to be performed more easily and accurately.

Additional aspects, objects, embodiments and advantages of the present teachings will become apparent upon reading the following detailed description in view of the appended drawings and claims.

BRIEF DESCRIPTION OF THE DRAWINGS

FIG. 13 shows a display example of the display device after the first sensing operation has been performed in the multi-scan mode.

FIG. 14 shows a display example of the display device after a second sensing operation has been performed in the multi-scan mode.

DETAILED DESCRIPTION OF THE INVENTION

Although embodiments according to the present invention will be explained below, with reference to the drawings, the present invention is not limited to the embodiments.

In the present embodiment, positional relationships between parts will be explained using the terms "left," "right," "front," "rear," "up," and "down." Each of these terms indicates a direction or a relative position with respect to the center of an embedded-object scanner device (wall scanner) 1.

Overview of Embedded-Object Scanner Device (Wall Scanner)

Figure 1:
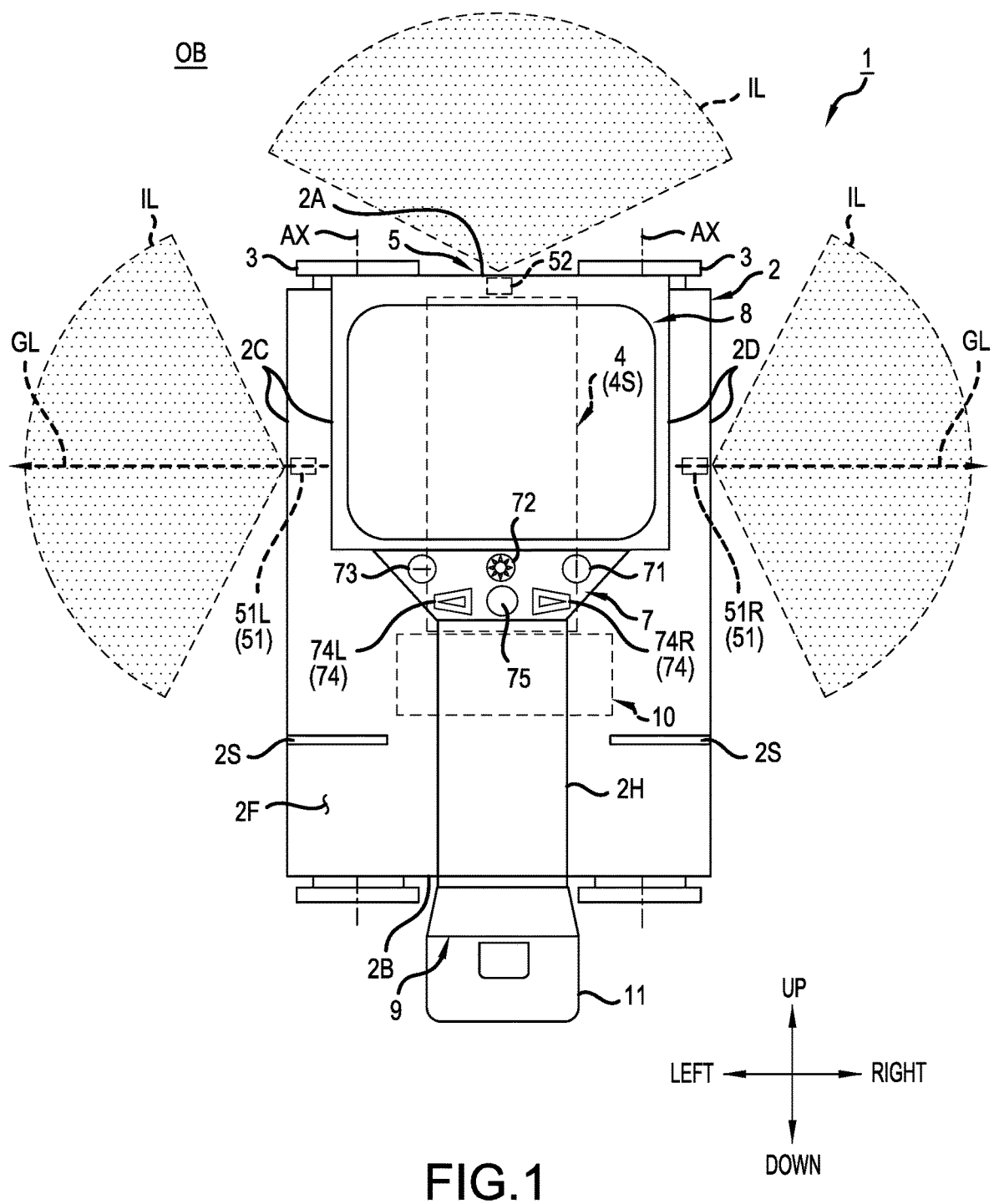
FIG. 1 is a front view that schematically shows an embedded-object scanner device according to a representative embodiment of the present teachings.
Figure 2:
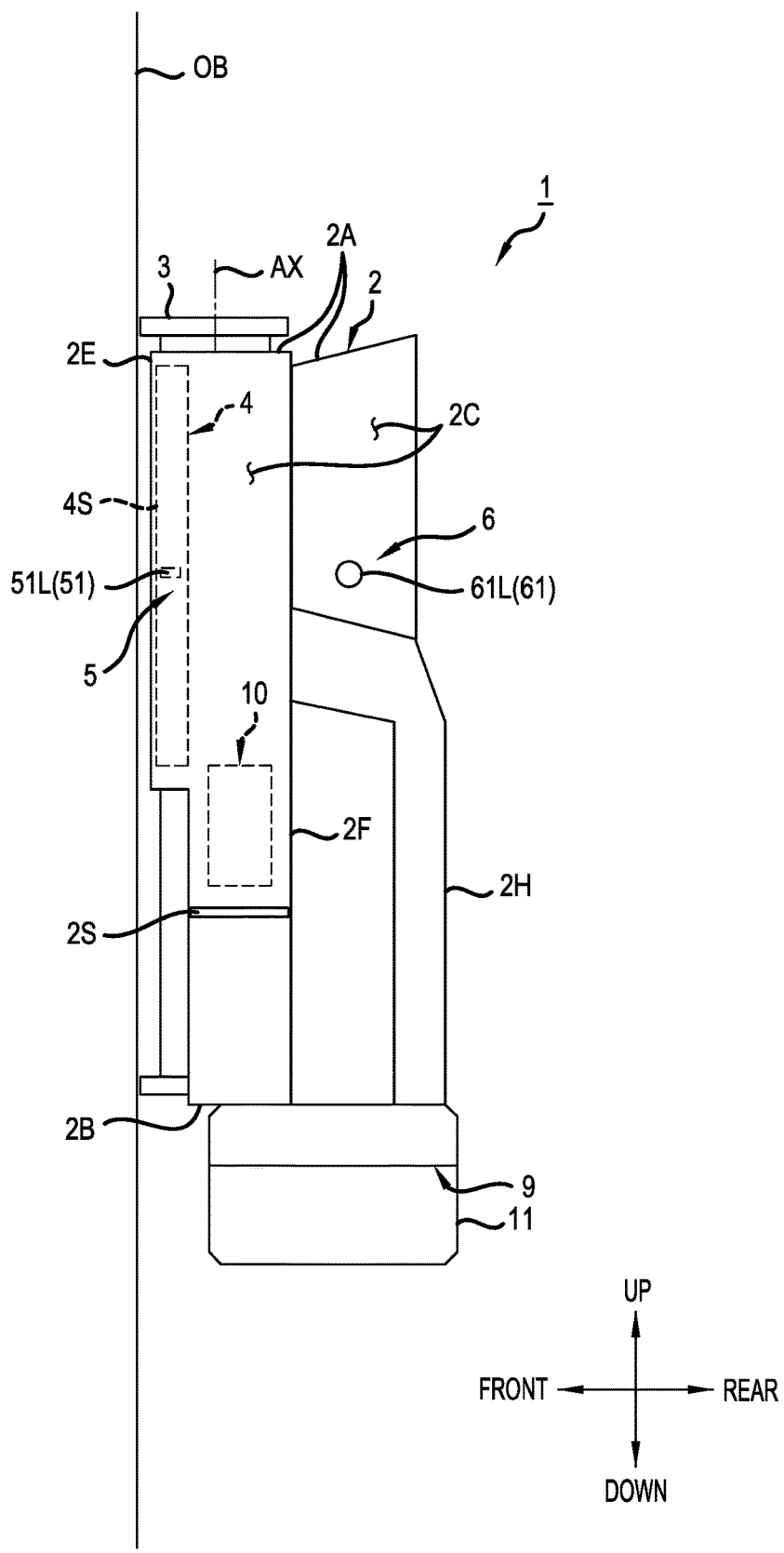
FIG. 2 is a side view that schematically shows the embedded-object scanner device according to the embodiment of FIG. 1.
Figure 3:
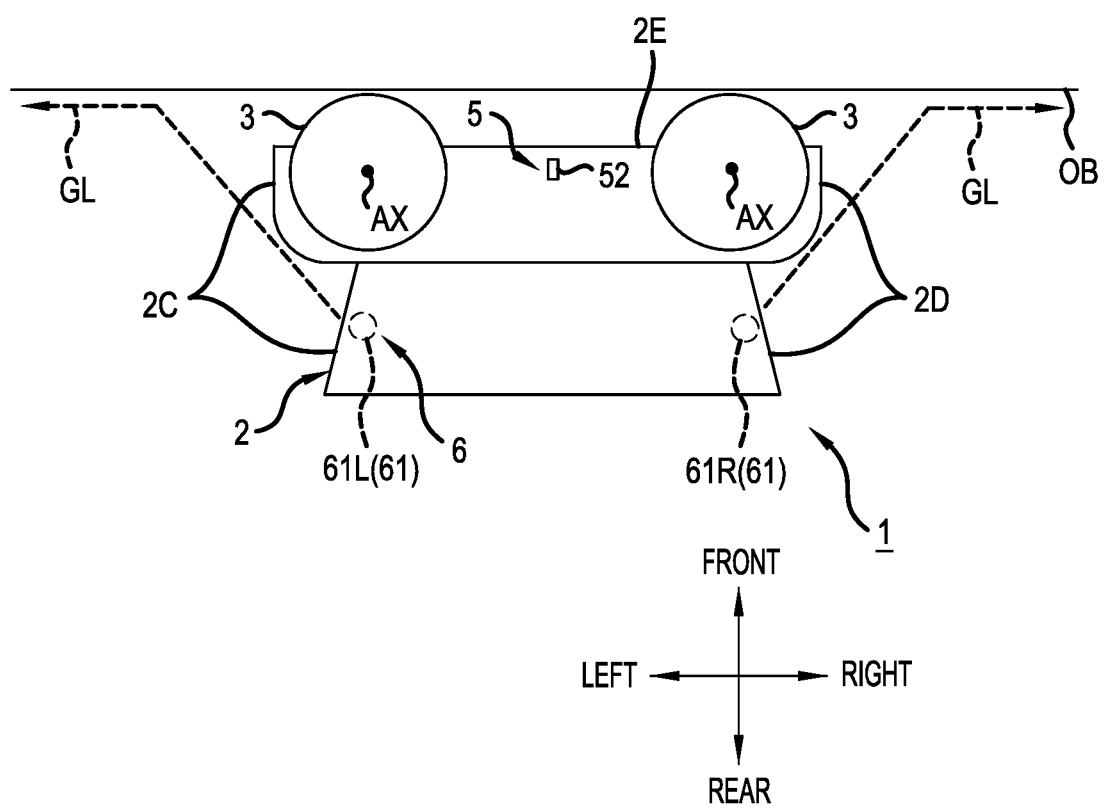
FIG. 3 is a top view that schematically shows the embedded-object scanner device according to the embodiment of FIG. 1.

FIG. 1 is a front view that schematically shows the embedded-object scanner device (wall scanner) 1 according to a representative, not limiting (present) embodiment of the present teachings. FIG. 2 is a side view that schematically shows the embedded-object scanner device 1 according to the present embodiment. FIG. 3 is a top view that schematically shows the embedded-object scanner device 1 according to the present embodiment.

The embedded-object scanner device 1 emits sensing waves into a target material OB to nondestructively inspect the target material OB. The embedded-object scanner device 1 scans for embedded objects embedded in the target material OB. A concrete wall is an illustrative example of a target material OB. A steel-reinforcing rod ("rebar") embedded in the concrete wall is an illustrative example of an embedded object. However, the embedded-object scanner device 1 according to the present invention may be used to detect other types of embedded objects (e.g., nails, wood, etc.) in other types of target materials (e.g., wood, ceramic, drywall, etc.).

The embedded-object scanner device 1 comprises a housing 2, rollers 3, a sensing device 4, one or more illumination devices 5, one or more indicator devices 6, a manual-operation device 7, a display device (display) 8, a battery-mounting part 9, and a control device (controller, processor) 10.

The housing 2 houses the sensing device 4 and the control device 10. The housing 2 has: an upper surface 2A, which faces upward; a lower surface 2B, which faces downward; a left-side surface 2C, which faces leftward; a right-side surface 2D, which faces rightward; a front surface 2E, which faces frontward; and a rear surface 2F, which faces rearward. The housing 2 comprises a handle 2H and covers at least a portion of the rollers 3. A user can perform scanning work by holding the handle 2H. Guidance parts 2S are provided on/in at least a portion of the housing 2. The guidance parts 2S may include, e.g., slits, which are provided in the housing 2.

The rollers 3 rotate about respective rotational axes AX when the rollers 3 contact a surface of the target material OB and the embedded-object scanner device 1 is rolled rightward or leftward. When the rollers 3 contact the surface of the target material OB, the front surface 2E of the housing 2 opposes the surface of the target material OB. Because the rollers 3 are rotatably supported by at least a portion of the housing 2, the user may hold the handle 2H and move the housing 2 such that the rollers 3 rotate about rotational axes AX in the state in which the rollers 3 are in contact with the surface of the target material OB. Therefore, the embedded-object scanner device 1 can smoothly move across the surface of the target material OB owing to the rotation of the rollers 3.

The embedded-object scanner device 1 scans for embedded objects while moving, in the left-right direction, across the surface of the target material OB. When scanning for embedded objects, the embedded-object scanner device 1 is disposed on the surface of the target material OB such that the rotational axes AX of the rollers 3 extend in the up-down direction. That is, in the present embodiment, the user causes the rollers 3 to rotate such that the embedded-object scanner device 1 moves in the left-right direction.

The rollers 3 are provided leftward and rightward of the center of the housing 2. As was noted above, at least a portion of each roller 3 is covered by the housing 2.

The sensing waves emitted from the sensing device 4 strike the target material OB to sense embedded objects that are embedded in the target material OB. The sensing device 4 has a sensing surface 4S that, in the state in which the rollers 3 and the surface of the target material OB are in contact, opposes the target material OB across at least a portion of the housing 2. The sensing surface 4S is disposed between the pair of rollers 3.

The position of the center of the housing 2 and the position of the center of the sensing surface 4S preferably at least substantially coincide in the left-right direction.

The sensing surface 4S includes an emitting part (transmitter), which emits the sensing waves, and a receiving part (receiver), which receives sensing waves that were reflected by one or more embedded objects. Sensing waves emitted from the sensing surface 4S to the target material OB via the front surface 2E pass through the target material OB and strike the embedded object(s) and some of the sensing waves are reflected by the embedded object(s). Some of the sensing waves reflected by the embedded object(s) impinge on the sensing surface 4S via the front surface 2E. The sensing device 4 receives the sensing waves reflected by the embedded object(s), which enables the shape(s) and location(s) of the embedded object(s) to be sensed (detected). In the present embodiment, the sensing waves may be radio waves. In this case, the sensing device 4 may be a radar device. However, it is noted that in an alternate embodiment the sensing waves may be ultrasonic waves.

While the rollers 3 contact the surface of the target material OB and sensing waves are being emitted from the sensing surface 4S, the user holds the handle 2H and moves the housing 2 in the left-right direction such that the rollers 3 rotate about the rotational axes AX. That is, while the sensing surface 4S is opposing the surface of the target material OB and sensing waves are being emitted from the sensing surface 4S, the user moves the housing 2 such that the sensing device 4 is moved in the left-right direction. The sensing device 4 senses (detects) the embedded object(s) while being moved in the left-right direction. The embedded-object scanner device 1 can, while moving across the surface of the target material OB in the left-right direction, scan for embedded objects in a plurality of regions (areas) of the target material OB, as will be further discussed below.

The illumination device(s) 5 illuminate(s) at least portions of the surface of the target material OB. The illumination device(s) 5 is/are provided on the housing 2. For example, when the rollers 3 are in contact with the surface of the target material OB, the illumination device(s) 5 may illuminate, with illumination light(s) IL, one or more portions of the surface of the target material OB around the housing 2. The illumination device(s) 5 may comprise, e.g., LEDs (light-emitting diodes).

In the present embodiment, multiple illumination devices 5 are provided and comprise: illumination-light-emitting parts 51, which respectively emit illumination lights IL from the housing 2 in the left and right directions; and an illumination-light-emitting part 52, which emits illumination light IL from the housing 2 in the up-down direction. The illumination-light-emitting parts 51 and the illumination-light-emitting part 52 are each provided on an outer surface of the housing 2.

The illumination-light-emitting parts 51 are provided on edges of the outer surface of the housing 2 in the left-right direction. The illumination-light-emitting parts 51 may comprise: a left illumination-light-emitting part 51L, which emits illumination light IL from the housing 2 leftward; and a right illumination-light-emitting part 51R, which emits illumination light IL from the housing 2 rightward. The left illumination-light-emitting part 51L is provided on the left-side surface 2C of the housing 2. The right illumination-light-emitting part 51R is provided on the right-side surface 2D of the housing 2. The left illumination-light-emitting part 51L illuminates at least a portion of the surface of the target material OB that is leftward of the housing 2. The right illumination-light-emitting part 51R illuminates at least a portion of the surface of the target material OB that is rightward of the housing 2.

The illumination-light-emitting part 52 is provided on an edge of the outer surface of the housing 2 in the up-down direction. In the present embodiment, the illumination-light-emitting part 52 is an upper illumination-light-emitting part that emits illumination light IL from the housing 2 in the up direction. The illumination-light-emitting part 52 is provided on the upper surface 2A of the housing 2 and illuminates at least a portion of the surface of the target material OB that is upward of the housing 2.

It is noted that the illumination-light-emitting part 52 may further comprise a lower illumination-light-emitting part that emits illumination light IL from the housing 2 in the down direction. The lower illumination-light-emitting part would be provided on the lower surface 2B of the housing 2 and would illuminate at least a portion of the surface of the target material OB that is downward of the housing 2.

The positions of the illumination-light-emitting parts 51 and the position of the center of the sensing surface 4S preferably at least substantially coincide in the up-down direction (i.e. the length direction of the device 1). The position of the illumination-light-emitting part 52 and the position of the center of the sensing surface 4S preferably at least substantially coincide in the left-right direction (i.e. the width direction of the device 1).

The indicator devices 6 indicate the position of the sensing surface 4S in the housing 2 and are provided on the housing 2. Preferably, the indicator devices 6 indicate the position of the center of the sensing surface 4S in the up-down direction. In addition or in the alternative, a pair of indicator devices 6 could be provided on each of the left and right sides (edges) of the device 1 and may respectively indicate the range (length) of the scanning surface 4S in the up-down direction.

In the present embodiment, the indicator devices 6 comprise laser-light emitting parts 61, which respectively emit laser lights GL in the left and right directions. Thus, the indicator devices 6 may be laser devices, e.g., laser diodes.

The laser-light emitting parts 61 are respectively provided on the left and right sides (edges) of the outer surface of the housing 2 in the left-right direction. The laser-light emitting parts 61 comprise: a left laser-light-emitting part 61L, which emits laser light GL from the housing 2 leftward; and a right laser-light-emitting part 61R, which emits laser light GL from the housing 2 rightward. More specifically, the left laser-light-emitting part 61L is provided on the left-side surface 2C of the housing 2. The right laser-light-emitting part 61R is provided on the right-side surface 2D of the housing 2. The left laser-light-emitting part 61L illuminates, with laser light GL, at least a portion of the surface of the target material OB that is leftward of the housing 2. The right laser-light-emitting part 61R illuminates, with laser light GL, at least a portion of the surface of the target material OB that is rightward of the housing 2.

The positions of the laser-light emitting parts 61 and the position of the center of the sensing surface 4S preferably at least substantially coincide in the up-down direction.

The laser-light emitting parts 61 are disposed rearward of the illumination-light-emitting parts 51, as shown in FIG. 2. The positions of the laser-light emitting parts 61 and the positions of the illumination-light-emitting parts 51 preferably at least substantially coincide in the up-down direction.

In the left-right direction, the distance between the center of the housing 2 and the laser-light emitting parts 61 is shorter than the distance between the center of the housing 2 and the edges of the housing 2. That is, the left laser-light-emitting part 61L is provided at a location that is closer to the center of the housing 2 than is an outermost left edge of the housing 2. The right laser-light-emitting part 61R is provided at a location that is closer to the center of the housing 2 than is an outermost right edge of the housing 2.

In addition, in the left-right direction, the distance between the center of the housing 2 and the laser-light emitting parts 61 is shorter than the distance between the center of the housing 2 and the illumination-light-emitting parts 51. That is, the left laser-light-emitting part 61L is provided at a location that is closer to the center of the housing 2 than is the left illumination-light-emitting part 51L. The right laser-light-emitting part 61R is provided at a location that is closer to the center of the housing 2 than is the right illumination-light-emitting part 51R.

The manual-operation device 7 generates manual-operation signals in accordance with manual operation (e.g., pressing) of the manual-operation device 7 by the user. In the present embodiment, the manual-operation device 7 generates manual-operation signals for at least the illumination devices 5.

The manual-operation signals for the illumination devices 5 preferably include a start signal, which starts (turns ON) the illumination devices 5. The manual-operation signals for the illumination devices 5 also preferably include a stop signal, which stops (turns OFF) the illumination devices 5. The manual-operation signals for the illumination devices 5 may also include a light-intensity adjusting signal, which adjusts the light intensity of the illumination lights IL emitted from the illumination devices 5. The illumination devices 5 are started and stopped by manually operating (pressing one or more buttons on) the manual-operation device 7. The light intensity of illumination lights IL is adjusted by manually operating (pressing one or more buttons on) the manual-operation device 7.

The manual-operation device 7 preferably comprises a plurality of buttons (button switches) disposed on the outer surface of the housing 2. As shown in FIG. 1, in the present embodiment, the manual-operation device 7 comprises a POWER button 71, a SETTINGS button 72, a MENU button 73, two MOVE buttons 74, and an ENTER button 75. The two MOVE buttons 74 include a MOVE LEFT button 74L and a MOVE RIGHT button 74R.

The POWER button 71 is pressed to switch between the starting and stopping of (i.e. to turn ON and OFF) the embedded-object scanner device 1. The SETTINGS button 72 is pressed to switch a SETTINGS screen displayed on the display device 8. The MENU button 73 is pressed to switch a MENU screen displayed on the display device 8. The MOVE buttons 74 are pressed to move a cursor or a selection frame displayed on the display device 8. The ENTER button 75 is pressed to confirm (input) an option, from among a plurality of options displayed on the MENU screen or the SETTINGS screen, selected by the cursor or the selection frame.

The display device 8 is provided on the housing 2 and is configured to display a variety of types of display data. Flat panel displays, such as LCDs (liquid-crystal displays) and OELDs (organic electroluminescent displays, which are also known as organic EL displays), are illustrative examples of the display device 8 according to the present teachings. A touchscreen optionally be used as the display device 8, in which case one or more of the buttons on the manual-operation device 7 may be omitted by providing corresponding icons to be touched on the touchscreen.

A battery 11 designed for a power tool is mounted on the battery-mounting part 9 and functions as the power supply of the embedded-object scanner device 1.

The control device 10 controls the embedded-object scanner device 1 and comprises a computer system. For example, the control device 10 may comprise: an arithmetic-processing unit that includes a processor such as a CPU (central processing unit); a storage device (hereinafter, simply "storage") that includes volatile memory, such as RAM (random-access memory), and nonvolatile memory, such as read-only memory (ROM); and an input/output interface.

Battery-Mounting Part

Figure 4:
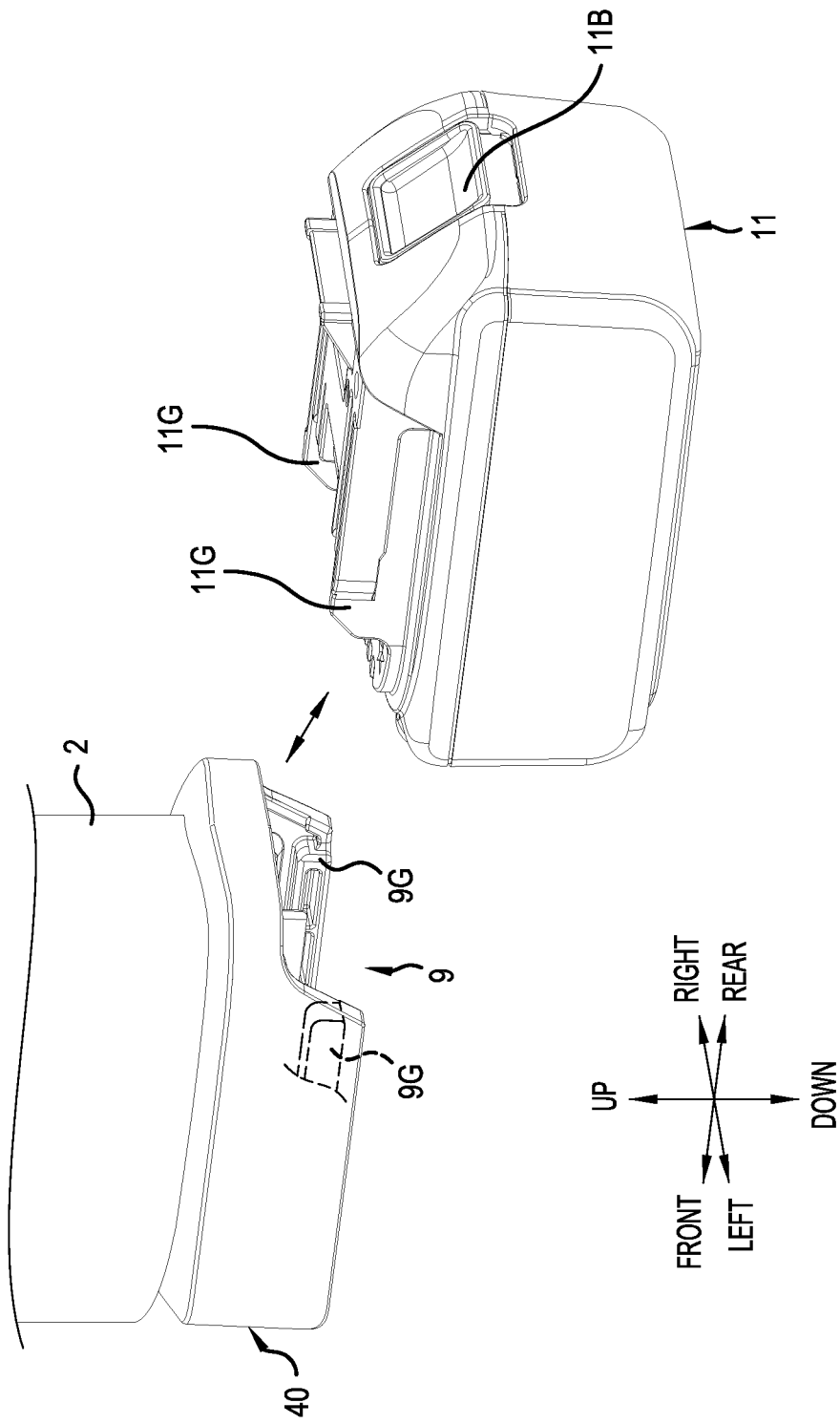
FIG. 4 shows a battery-mounting part according to the embodiment of FIG. 1.

FIG. 4 shows the battery-mounting part 9 according to the present embodiment. As shown in FIG. 4, the battery-mounting part 9 comprises: a pair of guide rails 9G, which guide the battery (battery pack, battery cartridge) 11; and connection terminals, which is connected to battery terminals of the battery 11. The guide rails 9G are arranged so as to extend in parallel in the left-right direction. The connection terminals are disposed between the pair of guide rails 9G.

The battery 11 is a direct-current power supply that is used with power tools and, in particular, is used as the power supply of the embedded-object scanner device 1 of the present embodiment. The battery 11 comprises (contains) a plurality of lithium-ion battery cells that are rechargeable by a charger. The battery 11 is portable. The battery 11 supplies current (electric power) to the sensing device 4, the illumination device(s) 5, the indicator device(s) 6, the manual-operation device 7, the display device 8, and the control device 10.

The battery 11 comprises: two slide rails 11G, which are respectively guided in the guide rails 9G; battery terminals, which are connected to the connection terminals of the battery-mounting part 9; and a release (latching) button (tab) 11B.

The slide rails 11G are disposed parallel to one another so as to be guided in the guide rails 9G of the battery-mounting part 9. The battery terminals are disposed between the pair of slide rails 11G. When the battery 11 is mounted on the battery-mounting part 9, the battery terminals of the battery 11 are electrically connected with the connection terminals of the battery-mounting part 9.

The release button 11B is pressed to release the attachment (latching) of the battery 11 to the battery-mounting part 9.

When the battery 11 is to be mounted on the battery-mounting part 9, the user inserts the battery 11 into the battery-mounting part 9 from the rear of the battery-mounting part 9. While the slide rails 11G are being guided in the guide rails 9G, the battery 11 is moved across the battery-mounting part 9 such that the battery terminals and the connection terminals come into contact and become connected. By virtue of the electrical connection of the battery terminals with the connection terminals, the battery 11 can supply current to a terminal block (not shown) disposed in the battery-mounting part 9.

When the battery 11 is to be removed from the battery-mounting part 9, the release button 11B is pressed. By the pressing of the release button 11B, the attachment (latching) of the battery 11 to the battery-mounting part 9 is released. After the attachment of the battery 11 to the battery-mounting part 9 has been released, the battery 11 is slid rearward and pulled out of the battery-mounting part 9.

Control Device (Controller)

Figure 5:
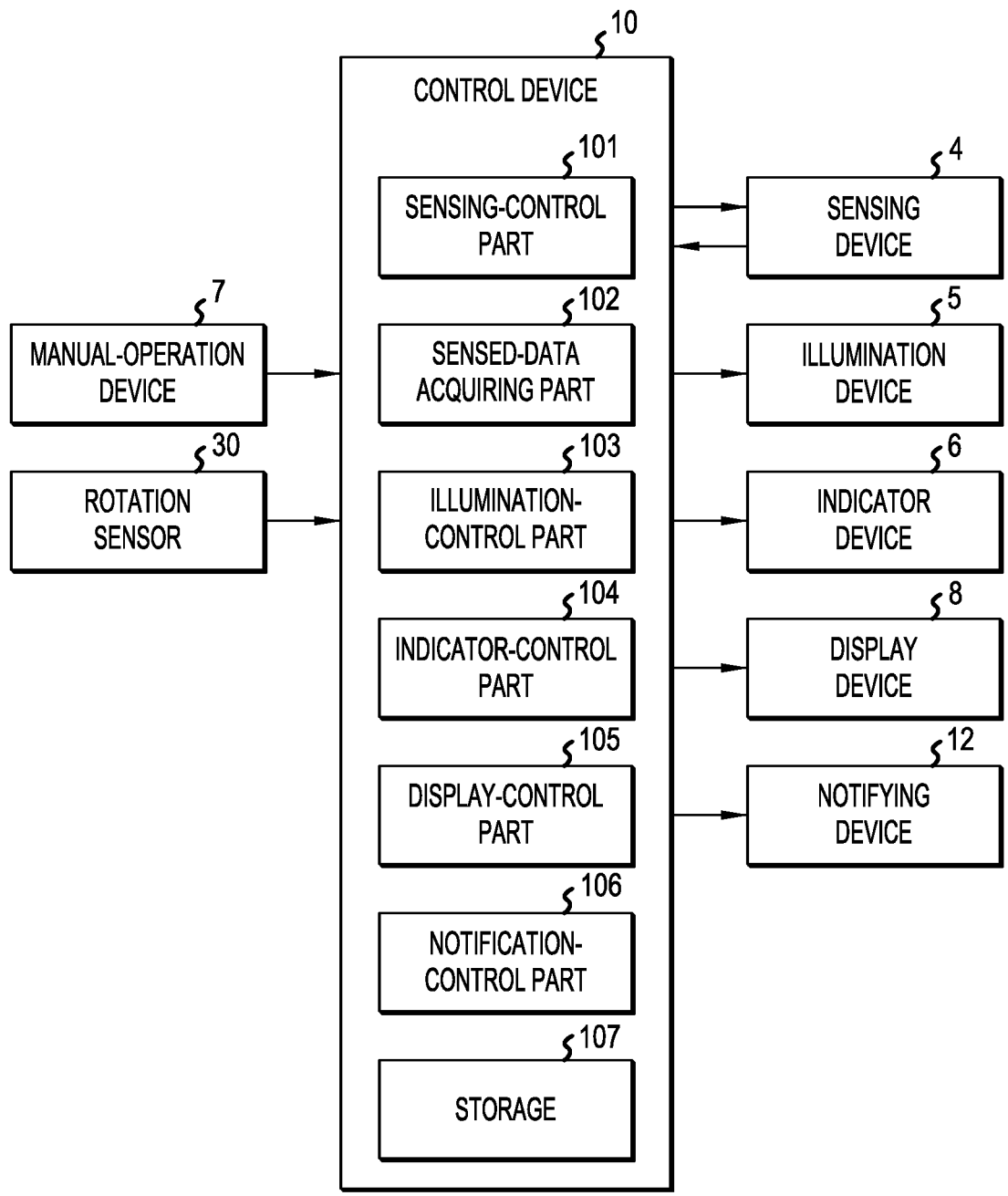
FIG. 5 is a functional block diagram that shows the embedded-object scanner device according to the embodiment of FIG. 1.

FIG. 5 is a functional block diagram that shows electrical components within the embedded-object scanner device 1 according to the present embodiment. As shown in FIG. 5, the control device (controller) 10 is connected to the manual-operation device 7, a rotation sensor 30, the sensing device 4, the illumination device(s) 5, the indicator device(s) 6, the display device 8, and a notifying device 12.

The rotation sensor 30 detects both the rotational direction and the rotational angle of one or both of the rollers 3. Sensed data generated by the rotation sensor 30 is output to the control device 10.

The notifying device 12 outputs notification data. For example, the notifying device 12 may include an audio-output device or a light-emitting device, or both. The audio-output device may output sound(s) as the notification data. The light-emitting device may output light as the notification data.

The control device 10 comprises a sensing-control part 101, a sensed-data acquiring part 102, an illumination-control part 103, an indicator-control part 104, a display-control part 105, a notification-control part 106, and a storage 107.

The sensing-control part 101 controls the sensing device 4, in particular to cause the emitter part (transmitter) of the sensing surface 4S to emit sensing waves. Therefore, the sensing-control part 101 outputs control instructions that control the operation of the sensing device 4. In the present embodiment, the sensing-control part 101 outputs, e.g., control instructions to start and end each sensing operation performed by the sensing device 4.

The sensed-data acquiring part 102 acquires sensed data output from the sensing device 4, in particular acquires (inputs) data concerning sensing waves that were reflected back from embedded objects and received by the receiving part (receiver) of the sensing surface 4S. Thus, the sensed-data acquiring part 102 acquires (input) sensed data that indicates one or more embedded objects sensed (detected) by the sensing device 4. In addition, the sensed-data acquiring part 102 also may acquire (input) the sensed data output from the rotation sensor 30.

The illumination-control part 103 controls the illumination devices 5, e.g., based on manual-operation signals output from the manual-operation device 7. For example, if a start signal (one type of manual-operation signal) has been output from the manual-operation device 7, then the illumination-control part 103 causes one or more illumination lights IL to be emitted from the illumination devices 5. Thereby, at least a portion of the surface of the target material OB is illuminated by illumination lights IL. If a stop signal (another type of manual-operation signal) has been output from the manual-operation device 7, then the illumination-control part 103 causes the emission of the illumination light(s(IL from the illumination device(s) 5 to stop. If a light-intensity adjusting signal (another type of manual-operation signal) has been output from the manual-operation device 7, then the illumination-control part 103 adjusts the light intensity of the illumination light(s) IL emitted from the illumination device(s) 5.

Figure 6:
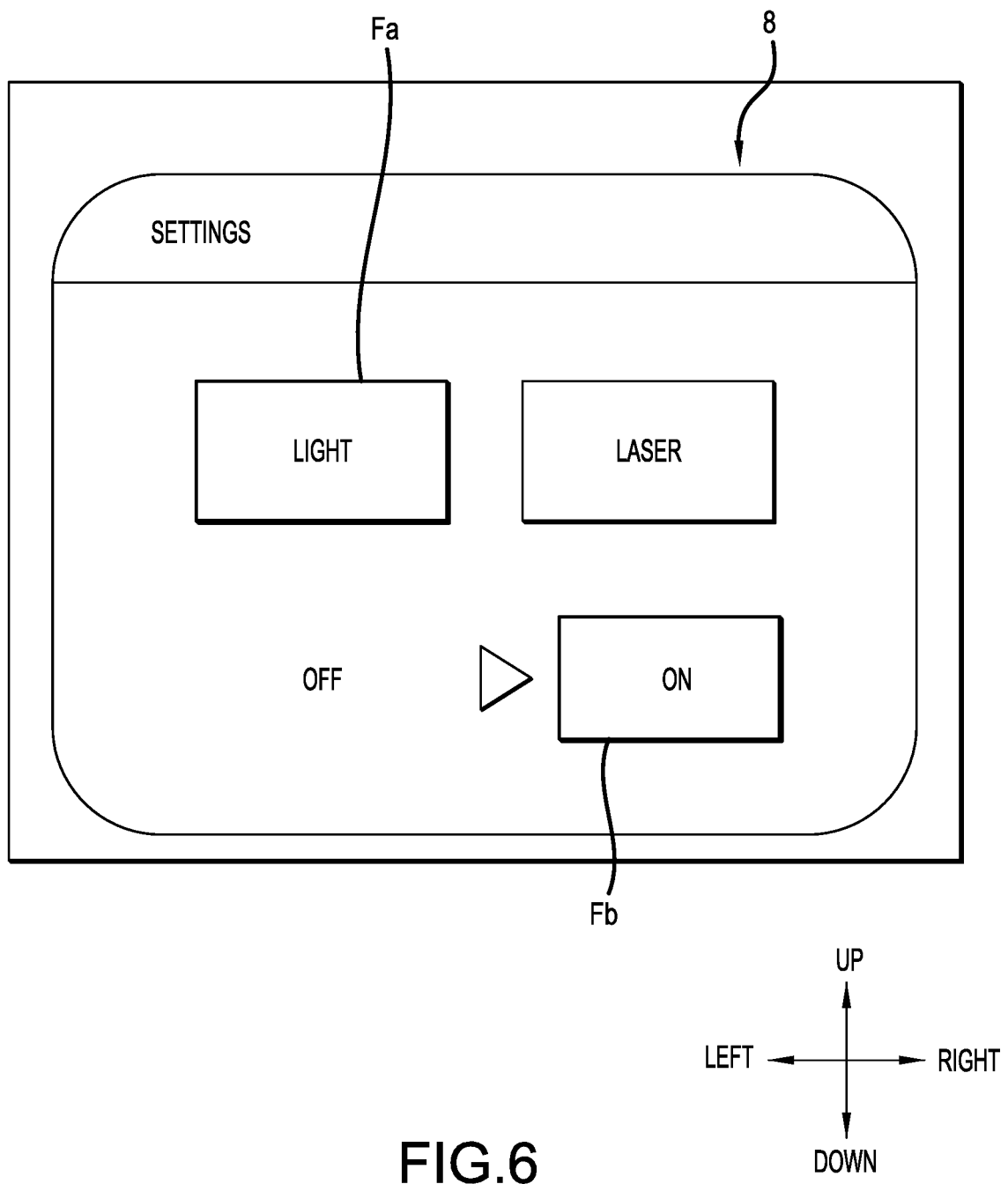
FIG. 6 shows a display example of a display device, according to the embodiment of FIG. 1, for use when starting and stopping an illumination device.

FIG. 6 shows a display example of the display device 8, according to the present embodiment, for use when starting and stopping the illumination devices 5. As shown in FIG. 6, when starting and stopping the illumination devices 5, the user manually operates the manual-operation device 7 to cause the SETTINGS screen, which is for use when starting and stopping the illumination devices 5, to be displayed on the display device 8. More specifically, the user presses the SETTINGS button 72 and the MENU button 73 to cause the SETTINGS screen as shown in FIG. 6 to be displayed on the display device 8. Then, the user presses the MOVE buttons 74 so that a selection frame Fa surrounds "LIGHT" and thereafter presses the ENTER button 75. When one or more of the illumination devices 5 is to be started, the user, in the state in which "LIGHT" has been selected, presses the MOVE buttons 74 so that a selection frame Fb surrounds "ON" and then presses the ENTER button 75. Thereby, illumination light(s) IL is/are emitted from the illumination device(s) 5. If the illumination devices 5 are to be stopped (turned OFF), then the user, in the state in which "LIGHT" has been selected, presses the MOVE buttons 74 so that the selection frame Fb surrounds "OFF" and then presses the ENTER button 75. Thereby, the emission of the illumination lights IL from the illumination devices 5 is stopped.

Figure 7:
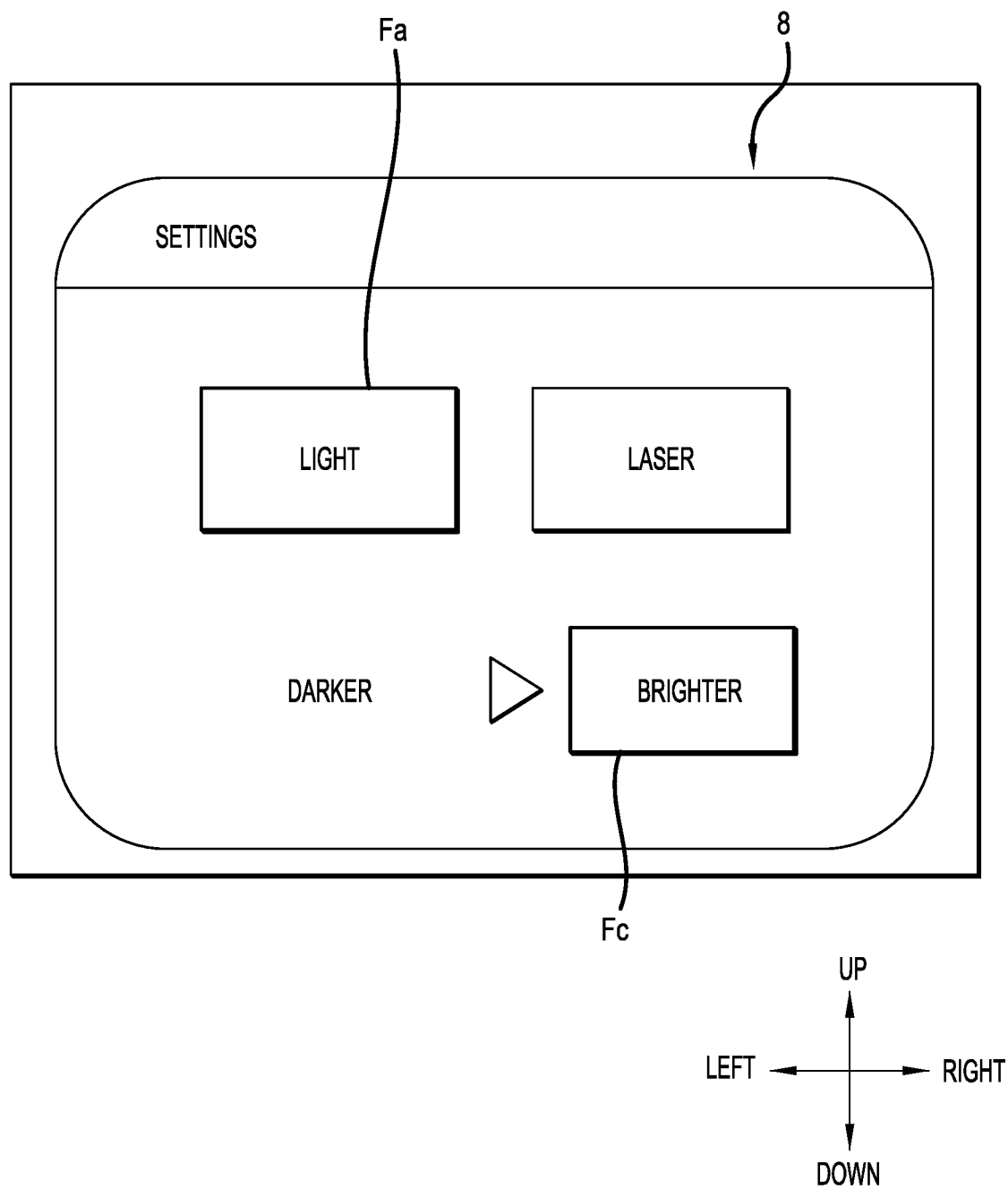
FIG. 7 shows a display example of the display device, according to the embodiment of FIG. 1, for use when adjusting the light intensity of illumination lights emitted from the illumination device.

FIG. 7 shows another display example of the display device 8, according to the present embodiment, for use when adjusting the light intensity of the illumination light(s) IL emitted from the illumination device(s) 5. As shown in FIG. 7, when adjusting the light intensity of the illumination light(s) IL emitted from the illumination device(s) 5, the user manually operates the manual-operation device 7 to cause the SETTINGS screen for adjusting the light intensity of the illumination lights IL to be displayed on the display device 8. More specifically, the user presses the SETTINGS button 72 and the MENU button 73 to cause the SETTINGS screen as shown in FIG. 7 to be displayed on the display device 8. The user then presses the MOVE buttons 74 so that the selection frame Fa surrounds "LIGHT" and thereafter presses the ENTER button 75. If the light intensity of illumination lights IL is to be increased, then the user, in the state in which "LIGHT" has been selected, presses the MOVE buttons 74 so that a selection frame Fc surrounds "BRIGHTER" and then presses the ENTER button 75. Thereby, the light intensity of the illumination light(s) IL emitted from the illumination device(s) 5 is increased. If the light intensity of illumination light(s) IL is to be decreased, then the user, in the state in which "LIGHT" has been selected, presses the MOVE buttons 74 so that the selection frame Fc surrounds "DARKER" and then presses the ENTER button 75. Thereby, the light intensity of the illumination light(s) IL emitted from the illumination device(s) 5 is decreased.

The indicator-control part 104 controls the indicator devices 6, e.g., based on manual-operation signals output from the manual-operation device 7. For example, if a start signal (one type of manual-operation signal) has been output from the manual-operation device 7, then the indicator-control part 104 causes one or more laser lights GL to be emitted from the indicator devices 6. Thereby, at least a portion of the surface of the target material OB is illuminated by laser light(s) GL. If a stop signal (another type of manual-operation signal) has been output from the manual-operation device 7, then the indicator-control part 104 causes the emission of laser light(s) GL from the indicator device(s) 6 to be stopped (turned OFF). If a light-intensity adjusting signal (another type of manual-operation signal) has been output from the manual-operation device 7, then the indicator-control part 104 adjusts the light intensity of the laser light(s) GL emitted from the indicator device(s) 6.

As shown in FIG. 6, when the indicator device(s) 6 is/are to be started or stopped, the user manually operates the manual-operation device 7 to cause the SETTINGS screen for starting and stopping the indicator device(s) 6 to be displayed on the display device 8. The user presses the SETTINGS button 72 and the MENU button 73 to cause the SETTINGS screen, as shown in FIG. 6, to be displayed on the display device 8. The user presses the MOVE buttons 74 so that the selection frame Fa surrounds "LASER" and then presses the ENTER button 75. If the indicator device(s) 6 is/are to be started (turned ON), then the user, in the state in which "LASER" has been selected, presses the MOVE buttons 74 so that the selection frame Fb surrounds "ON" and then presses the ENTER button 75. Thereby, laser light(s) GL is/are emitted from the indicator device(s) 6. If the indicator device(s) 6 is/are to be stopped (turned off), then the user, in the state in which "LASER" has been selected, presses the MOVE buttons 74 so that the selection frame Fb surrounds "OFF" and then presses the ENTER button 75. Thereby, the emission of the laser light(s) GL from the indicator device(s) 6 is stopped.

As shown in FIG. 7, to adjust the light intensity of the laser light(s) GL emitted from the indicator device(s) 6, the user manually operates the manual-operation device 7 so as to cause the SETTINGS screen for adjusting the light intensity of the laser light(s) GL to be displayed on the display device 8. The user presses the SETTINGS button 72 and the MENU button 73 and thereby causes the SETTINGS screen as shown in FIG. 7 to be displayed on the display device 8. The user presses the MOVE buttons 74 so that the selection frame Fa surrounds "LASER" and then presses the ENTER button 75. If the light intensity of laser light(s) GL is to be increased, then the user, in the state in which "LASER" has been selected, presses the MOVE buttons 74 so that the selection frame Fc surrounds "BRIGHTER" and then presses the ENTER button 75. Thereby, the light intensity of the laser light(s) GL emitted from the indicator device(s) 6 is increased. If the light intensity of laser light(s) GL is to be decreased, then the user, in the state in which "LASER" has been selected, presses the MOVE buttons 74 so that the selection frame Fc surrounds "DARKER" and then presses the ENTER button 75. Thereby, the light intensity of the laser light(s) GL emitted from the indicator device(s) 6 is decreased.

The display-control part 105 controls the display device 8, e.g., to cause prescribed display data to be displayed on the display device 8.

The notification-control part 106 controls the notifying device 12. For example, the notification-control part 106 may be configured to output prescribed sounds from the audio-output device as a type of notification to the user. In addition or in the alternative, the notification-control part 106 may be configured to cause prescribed light to be output from the light-emitting device as another type of notification to the user.

The storage 107 stores the sensed data of the sensing device 4 acquired by (input to) the sensed-data acquiring part 102, e.g., based on control instructions for the start and end of the sensing operation output from the sensing-control part 101.

Selection of the Scan Mode

The embedded-object scanner device 1 can scan for embedded objects in each of a plurality of scan modes that include a first scan mode and a second scan mode. In the present embodiment, the first scan mode is a single-scan mode that displays, on the display device 8, the display data generated in a single sensing operation performed by the sensing device 4. The second scan mode is a multi-scan mode that displays, collectively on the display device 8, multiple sets of display data generated by multiple sensing operations performed by the sensing device 4. The user can select the scan mode by manually operating (pressing one or more buttons on) the manual-operation device 7, as will described below.

Figure 8:
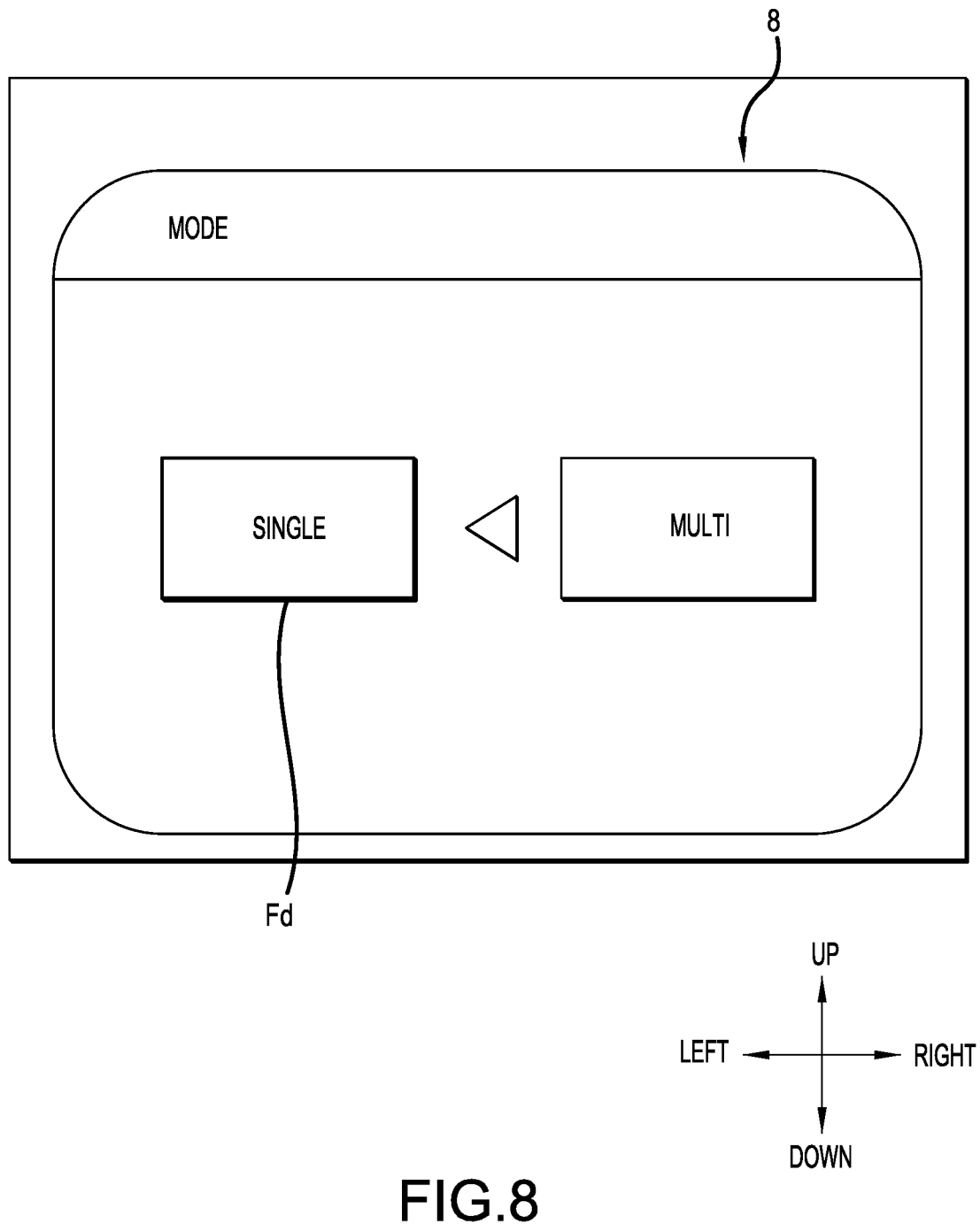
FIG. 8 shows a display example of the display device, according to the embodiment of FIG. 1, for use when selecting a scan mode.

FIG. 8 shows another display example of the display device 8, according to the present embodiment, for use when selecting the scan mode. As shown in FIG. 8, when the POWER button 71 is pressed to start the power supply of (turn ON) the embedded-object scanner device 1, the MENU screen for selecting the scan mode is displayed on the display device 8. If the single-scan mode is to be selected, the user presses the MOVE buttons 74 so that a selection frame Fd surrounds "SINGLE" and then presses the ENTER button 75. Thereby, the embedded-object scanner device 1 scans for embedded objects in the single-scan mode. If the multi-scan mode is to be selected, then the user presses the MOVE buttons 74 so that the selection frame Fd surrounds "MULTI" and then presses the ENTER button 75. Thereby, the embedded-object scanner device 1 scans for embedded objects in the multi-scan mode.

Single-Scan Mode

Figure 9:
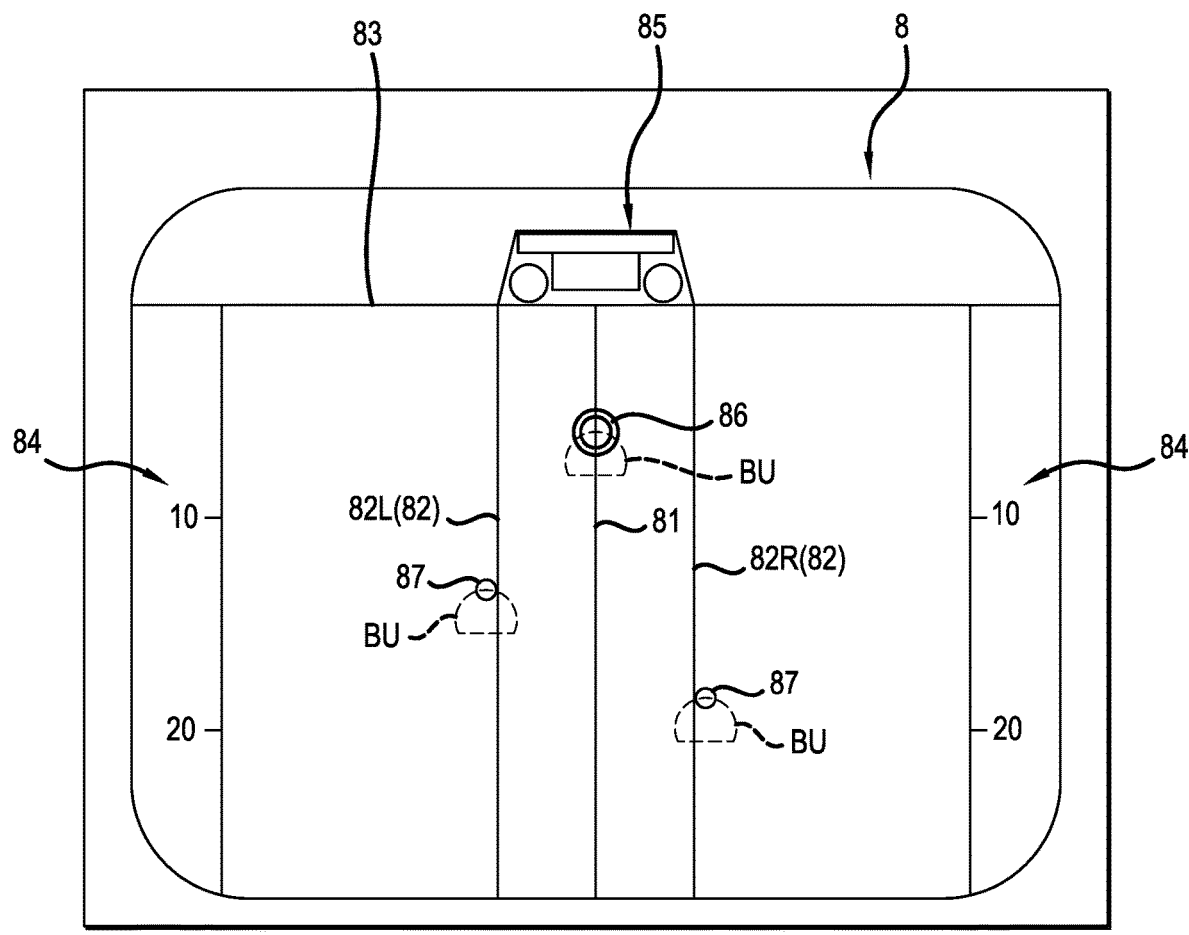
FIG. 9 shows a display example of the display device, according to the embodiment of FIG. 1, for use when scanning for embedded objects in a single-scan mode.

FIG. 9 shows another display example of the display device 8, according to the present embodiment, for use when scanning for embedded objects in the single-scan mode.

As shown in FIG. 9, in the single-scan mode, the display-control part 105 causes a centerline 81, which indicates the center of the housing 2 in the left-right direction, and edge lines 82, which indicate the left and right edges of the housing 2 (or, the left and right edges of the sensing surface 4S), to be displayed on the display device 8.

More specifically, the edge lines 82 include a left edge line 82L, which indicates the left edge of the housing 2 (or the sensing surface 4S), and a right edge line 82R, which indicates a right edge of the housing 2 (or the sensing surface 4S).

The centerline 81 is displayed such that it extends in the up-down direction in a central portion of the display screen of the display device 8. The left edge line 82L is displayed leftward of the centerline 81. The right edge line 82R is displayed rightward of the centerline 81. The left edge line 82L and the right edge line 82R are displayed such that they extend in the up-down direction on the display screen of the display device 8 in parallel with the centerline 81.

The display-control part 105 causes a surface line 83, which indicates the surface of the target material OB, to be displayed on the display device 8. The surface line 83 is displayed such that it extends in the left-right direction at an upper part of the display screen of the display device 8.

The display-control part 105 causes depth lines 84, which indicate the distance from the surface of the target material OB in the front-rear direction, to be displayed on the display device 8. The depth lines 84 are displayed such that they extend in the up-down direction at the left edge and the right edge of the display screen of the display device 8. The up-down direction of the display screen of the display device 8 corresponds to the front-rear direction of the target material OB, which corresponds to the depth direction extending from the surface of the target material OB. Numerical values, which indicate distances from the surface of the target material OB in the depth direction, are displayed next to each depth line 84.

The display-control part 105 causes an icon 85, which simulates the embedded-object scanner device 1 on the surface of the target material OB, to be displayed on the display device 8.

When the sensing surface 4S is opposing the surface of the target material OB and sensing waves are being emitted from the sensing surface 4S, the user causes the housing 2 to move such that the sensing device 4 is moved in the left-right direction. The sensed data generated by the sensing device 4 is acquired by (input to) the sensed-data acquiring part 102. If one or more embedded objects has been sensed by the sensing device 4, then the display-control part 105 causes an image or images BU of the embedded object(s) to be displayed on the display device 8.

The position of the centerline 81, the positions of the edge lines 82, the position of the surface line 83, and the positions of the depth lines 84 are each fixed on the display screen of the display device 8. The positions of the images BU of embedded objects change on the display screen of the display device 8 based on the positions of embedded objects in the target material OB. The sensing device 4, while being moved in the left-right direction, detects embedded objects. The positions of images BU of embedded objects change on the display screen of the display device 8 based on changes of the relative positions between the sensing device 4 and the embedded objects, as will be further explained below.

During the sensing operation performed by the sensing device 4, the position of the centerline 81 on the display screen of the display device 8 is prescribed such that, when the position of the center of the housing 2 and the position of an embedded object coincide in the left-right direction, the centerline 81 and the image BU coincide on the display screen of the display device 8. That is, when the position of the embedded-object scanner device 1 has been adjusted (moved) such that the centerline 81 and an image BU coincide on the display screen of the display device 8, the position of the center of the housing 2 and the position of the corresponding embedded object coincide in the left-right direction.

In addition, during the sensing operation performed by the sensing device 4, the position of each edge line 82 on the display screen of the display device 8 is prescribed such that, when the position of either of the edges of the housing 2 and the position of an embedded object coincide in the left-right direction, the corresponding edge line 82 and the corresponding image BU on the display screen of the display device 8 coincide. That is, when the position of the embedded-object scanner device 1 has been adjusted (moved) such that the left edge line 82L and an image BU on the display screen of the display device 8 coincide, the position of the left edge of the housing 2 (or left edge of the sensing surface 4S) and the position of the corresponding embedded object coincide in the left-right direction. Similarly, when the position of the embedded-object scanner device 1 has been adjusted (moved) such that the right edge line 82R and an image BU on the display screen of the display device 8 coincide, the position of the right edge of the housing 2 (or the right edge of the sensing surface 4S) and the position of the corresponding embedded object coincide in the left-right direction.

The display-control part 105 causes the image(s) BU of one or more embedded objects present between the center of the housing 2 and either of the edges of the housing 2 (or the edges of the sensing surface 4S) in the left-right direction to be displayed on the display device 8 using a first display indicia. The display-control part 105 causes the image(s) BU of one or more embedded objects present outward of the housing 2 (or outward of the edges of the sensing surface 4S) in the left-right direction to be displayed on the display device 8 using a second display indicia, which differs from the first display indicia, as will be further described below.

Therefore, one or more embedded objects present between the center of the housing 2 and the edges of the housing 2 (or the edges of the sensing surface 4S) in the left-right direction is/are embedded object(s) that is/are present between the left edge and the right edge of the housing 2. In other words, the one or more embedded objects present between the center of the housing 2 and the edges of the housing 2 (or the edges of the sensing surface 4S) in the left-right direction is/are embedded object(s) that is/are present at a position or positions at which it/they oppose(s) the embedded-object scanner device 1.

Embedded objects present outward of the housing 2 in the left-right direction are embedded objects that are present outward of the left edge or the right edge of the housing 2 (or the left and right edges of the sensing surface 4S). In other words, embedded objects present outward of the housing 2 in the left-right direction (or outward of the left and right edges of the sensing surface 4S) are embedded objects present at positions at which they do not oppose the embedded-object scanner device 1.

In the explanation below, the state in which an embedded object is present between the left edge and the right edge of the housing 2 may be called the "opposing state" where appropriate, and the state in which an embedded object is present outward of the left edge or the right edge of the housing 2 (or outward of the left and right edges of the sensing surface 4S) may be called the "non-opposing state" where appropriate.

In the interval during which a embedded object is sensed while the sensing device 4 is being moved in the left-right direction, the position of the embedded object changes from the opposing state to the non-opposing state, or vice versa. The display-control part 105 causes the image BU of an embedded object in the opposing state to be displayed on the display device 8 using the first display indicia. Furthermore, the display-control part 105 causes the image BU of an embedded object in the non-opposing state to be displayed on the display device 8 using the second display indicia.

More specifically, as shown in FIG. 9, the display-control part 105 causes the image BU of an embedded object in the opposing state to be displayed on the display device 8 using the first display indicia, which is a first mark 86 in the present embodiment. On the other hand, the display-control part 105 causes the image BU of an embedded object in the non-opposing state to be displayed on the display device 8 using the second display indicia, which is a second mark 87 in the present embodiment. To distinguish between the first display indicia and the second display indicia, for example and without limitation, the dimensions of the first mark 86 may be larger than the dimensions of the second mark 87. In addition or in the alternative, the brightness of the first mark 86 may be higher (brighter) than the brightness of the second mark 87. In addition or in the alternative, the display-control part 105 may cause the images BU to be displayed on the display device 8 such that images BU of embedded objects in the opposing state are accentuated (highlighted) more than images BU of embedded objects in the non-opposing state. If the display device 8 is a color display, images BU of embedded objects in the opposing state may be displayed in a different color than images BU of embedded objects in the non-opposing state.

The display device 8 displays the centerline 81, which indicates the center of the housing 2 in the left-right direction, and the pair of edge lines 82, which indicate the edges of the housing 2 in the left-right direction (or the left and right edges of the sensing surface 4S). As shown in FIG. 9, the display device 8 displays, using the first display indicia (e.g., first mark 86), the image BU of an embedded object that is located between the pair of edge lines 82, and displays, using the second display indicia (e.g., second mark 87), the images BU of embedded objects outward of the edge lines 82. If an embedded object changes from the opposing state to the non-opposing state, then the display device 8 changes from the state in which it displays the first mark 86 to the state in which it displays the second mark 87. On the other hand, if an embedded object changes from the non-opposing state to the opposing state, then the display device 8 changes from the state in which it displays the second mark 87 to the state in which it displays the first mark 86.

Figure 10A:
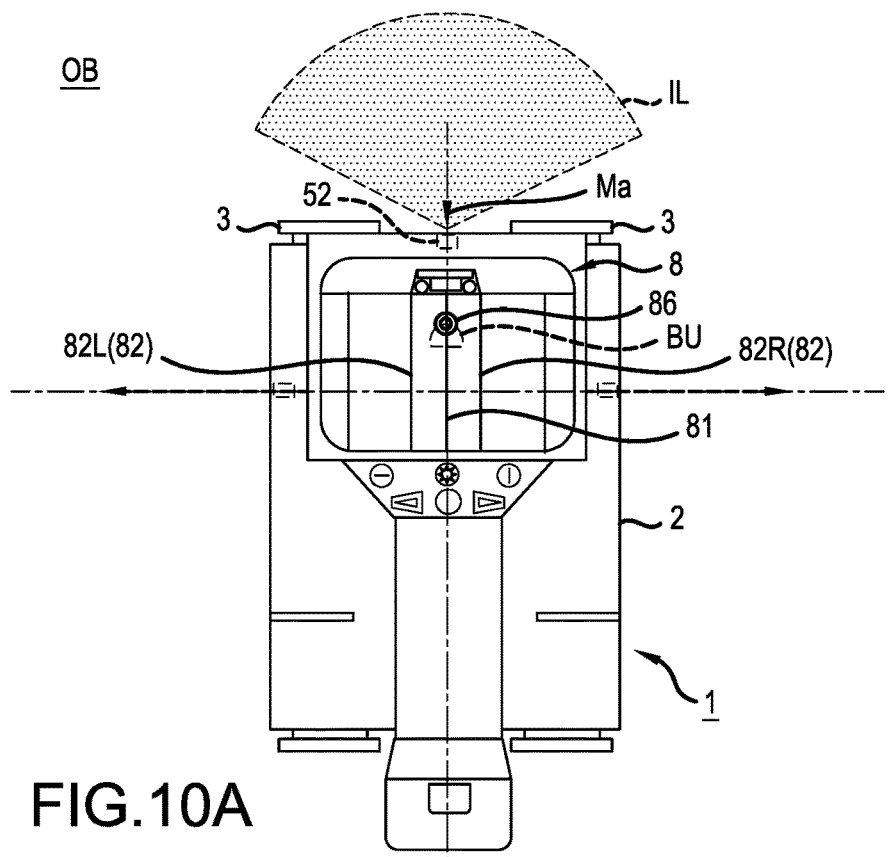
FIGS. 10A and 10B respectively show two views for explaining an embedded-object scanning method, which utilizes the embodiment of FIG. 1 in a single-scan mode.
Figure 10B:
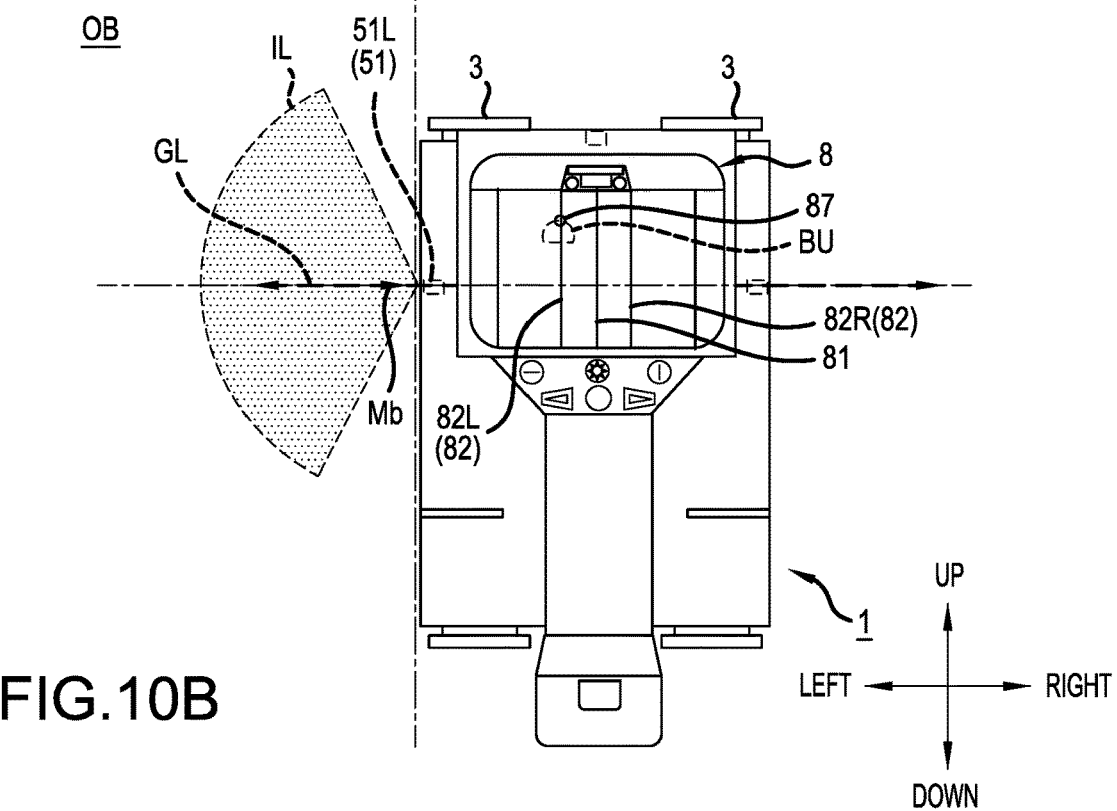

FIGS. 10A and 10B show two views for explaining an embedded-object scanning method in the single-scan mode according to the present embodiment.

The user scans for embedded objects by moving the embedded-object scanner device 1 with the sensing surface 4S opposing the surface of the target material OB and sensing waves being emitted from the sensing surface 4S. If an embedded object is detected by the sensing device 4, then an image BU of the embedded object is displayed on the display device 8. As shown in FIG. 10A, the user may adjust (move) the position of the embedded-object scanner device 1 such that the centerline 81 coincides with the image BU of the embedded object on the display screen of the display device 8.

If an image BU of an embedded object is present between the left edge line 82L and the right edge line 82R, then the display device 8 displays the image BU of that embedded object using the first display indicia. More specifically, the display device 8 displays the image BU of that embedded object, which is in the opposing state, such that it is accentuated by the first mark 86. The user, while viewing the first mark 86, may then adjust (move) the position of the embedded-object scanner device 1 such that the centerline 81 coincides with the image BU of the embedded object on the display screen of the display device 8. In other words, the user may adjust (move) the position of the embedded-object scanner device 1 such that the centerline 81 coincides with the first mark 86 on the display screen of the display device 8. When the position of the embedded-object scanner device 1 is adjusted (moved) such that the centerline 81 coincided with the image BU of the embedded object, the position of the center of the housing 2 coincides with the position of the embedded object in the left-right direction.

After the user has made the centerline 81 coincide with the image BU of the embedded object on the display screen of the display device 8, the user may use a marker (e.g., pencil) to mark the surface of the target material OB with a mark Ma. For example, the user may mark the surface of the target material OB upward of the housing 2 with the mark Ma at the center of the sensing surface 4S in the left-right direction.

As was mentioned above, the position of the illumination-light-emitting part 52 at least substantially coincides with the position of the center of the sensing surface 4S in the left-right direction. In addition, the position of the center of the housing 2 coincides with the position of the center of the sensing surface 4S in the left-right direction. When the centerline 81 is made to coincide with the image BU of an embedded object on the display screen, the mark Ma can be applied at the position of the center of the sensing surface 4S in the left-right direction by using the illumination-light-emitting part 52 as an indicator of the position of the center of the sensing surface 4S.

In the present embodiment, the surface of the target material OB upward of the housing 2 is illuminated by illumination light IL emitted from the illumination-light-emitting part 52. Consequently, even if the target material OB is located in a space that is dark, the user can apply the mark Ma in an easy and accurate manner.

After marking the surface of the target material OB with the mark Ma, the user moves the housing 2 in the left-right direction, with the rollers 3 in contact with the surface of the target material OB and sensing waves being emitted from the sensing surface 4S, such that the rollers 3 rotate about rotational axes AX. As shown in FIG. 10B, the user adjusts (moves) the position of the embedded-object scanner device 1 such that the left edge line 82L coincides with the image BU of the embedded object on the display screen of the display device 8.

If the image BU of an embedded object is located either on the left edge line 82L or outward of the left edge line 82L, then the display device 8 displays the image BU of that embedded object using the second display indicia. More specifically, the display device 8 displays the image BU of that embedded object, which is in the non-opposing state, using the second mark 87. While viewing the second mark 87, the user may adjust the position of the embedded-object scanner device 1 such that the left edge line 82L coincides with the image BU of the embedded object on the display screen of the display device 8. For example, the user may adjust (move) the position of the embedded-object scanner device 1 such that the left edge line 82L coincides with the second mark 87 on the display screen of the display device 8. Thus, when the position of the embedded-object scanner device 1 has been adjusted (moved) such that the left edge line 82L coincides with the image BU of the embedded object, the position of the left edge of the housing 2 coincides with the position of the embedded object.

After making the left edge line 82L coincide with the image BU of the embedded object on the display screen of the display device 8, the user may uses the marker (e.g., pencil) to mark the surface of the target material OB with a mark Mb. For example, the user may mark the surface of the target material OB leftward of the housing 2 with the mark Mb in the vicinity of the left edge of the housing 2 and within the illumination area of the laser light GL emitted from the left laser-light-emitting part 61L.

The position of the left laser-light-emitting part 61L, the position of the laser light GL emitted from the left laser-light-emitting part 61L, and the position of the center of the sensing surface 4S substantially coincide in the up-down direction. In addition, the position of the left edge of the housing 2 coincides with the position of the embedded object in the left-right direction. Consequently, when the left edge line 82L is made to coincide with the image BU of the embedded object, by virtue of the mark Mb being applied to the surface of the target material OB in the vicinity of the left edge of the housing 2, in which vicinity the laser light GL serves as an indicator, the user can apply the mark Mb at the position of the center of the sensing surface 4S in the state shown in FIG. 10A. That is, the user can mark the surface of the target material OB with the mark Mb at the position at which the embedded object is present.

In the present embodiment, the surface of the target material OB leftward of the housing 2 is illuminated by illumination light IL emitted from the left illumination-light-emitting part 51L. Consequently, even if the target material OB is in a space that is dark, the user can easily and accurately apply the mark Mb on the target material OB.

The work of marking the surface of the target material OB leftward of the housing 2 with the mark Mb was explained above. After completing the work that was explained with reference to FIG. 10A, the user can then mark the surface of the target material OB rightward of the housing 2 with the mark Mb by moving the embedded-object scanner device 1 leftward.

Multi-Scan Mode

Next, the multi-scan mode of the present embedded-object scanner method will be explained with reference to FIG. 11.

The multi-scan mode is a scan mode in which multiple sets of display data, which are generated by multiple sensing operations performed by the sensing device 4, are displayed collectively on the display device 8. As shown in FIG. 11, the user moves the embedded-object scanner device 1, with the sensing surface 4S opposing the surface of the target material OB, such that the sensing device 4 performs multiple sensing operations, more specifically three sensing operations in the up-down direction.

The sensing operations performed by the sensing device 4 include a manual-operation in which the sensing device 4 is moved (manually pushed) across the surface of the target material OB in the left-right direction. In the present embodiment, the sensing operations performed by the sensing device 4 include: a first sensing operation, in which the sensing device 4 is moved across a first area AR1 of the surface of the target material OB in the left-right direction; a second sensing operation, in which the sensing device 4 is moved across a second area AR2 of the surface of the target material OB in the left-right direction; and a third sensing operation, in which the sensing device 4 is moved across a third area AR3 of the surface of the target material OB in the left-right direction.

In the present embodiment, the first area AR1 is an area of the surface of the target material OB between position Pa and position Pb. The second area AR2 is an area of the surface of the target material OB between position Pc and position Pd. The third area AR3 is an area of the surface of the target material OB between position Pe and position Pf. The first area AR1, the second area AR2, and the third area AR3 are defined in the up-down direction. In the present embodiment, the second area AR2 is defined downward of the first area AR1. The third area AR3 is defined downward of the second area AR2.

Position Pa and position Pb substantially coincide in the up-down direction. Position Pc and position Pd substantially coincide in the up-down direction. Position Pe and position Pf substantially coincide in the up-down direction. Position Pa, position Pc, and position Pe substantially coincide in the left-right direction. Position Pb, position Pd, and position Pf substantially coincide in the left-right direction. Thus, areas AR1, AR2 and AR3 define three areas of the target material OB that are adjacent in the up-down (vertical) direction.

When multiple (consecutive) sensing operations are to be performed, the sensing-control part 101 outputs control instructions for the start and end of each of the multiple sensing operations. In the present embodiment, the start of each sensing operation includes the start of the storage (writing) of the sensed data generated by the sensing device 4 in the storage 107. The end of each sensing operation includes the end (termination) of the storage of the sensed data generated the sensing device 4 in the storage 107. Thus, based on the control instructions output from the sensing-control part 101, the storage 107 stores the sensed data of the sensing device 4. When a control instruction for the start of a sensing operation has been output from the sensing-control part 101, the storage 107 starts the storage of the sensed data generated by the sensing device 4 that was acquired by (input to) the sensed-data acquiring part 102. When a control instruction for the end of a sensing operation has been output from the sensing-control part 101, the storage 107 ends the storage of the sensed data generated by the sensing device 4.

The storage 107 stores the sensed data generated by the sensing device 4 in association with data that indicates the position of the sensing device 4 (the embedded-object scanner device 1) at the time of generating the sensed data. For example, the position can be determined based on the output from the rotation sensor 30 from the start of the storage of the sensed data (the start of the corresponding sensing operation) until the end of the same (the end of the corresponding sensing operation). In this manner, for example, the distance in the left-right direction of the sensing device 4 (the embedded-object scanner device 1) from the start positions Pa, Pc and Pe can be calculated based on the output of the rotation sensor 30 during the respective sensing operations (taking into consideration, for example, the size/diameter of the rollers 3).

The sensing-control part 101 also generates and outputs the control instructions for the start and stop of each of the sensing operations based on the distance between the sensing surface 4S of the sensing device 4 and the surface of the target material OB for the following reason. If the distance between the sensing surface 4S of the sensing device 4 and the surface of the target material OB changes while the sensing waves are being emitted from the sensing surface 4S, the intensity of the reflected sensing waves received by the sensing surface 4S will change. That is, the shorter the distance between the sensing surface 4S of the sensing device 4 and the surface of the target material OB, the higher the intensity of the reflected sensing waves received by the sensing surface 4S becomes. On the other hand, the longer the distance between the sensing surface 4S of the sensing device 4 and the surface of the target material OB, the lower the intensity of the reflected sensing waves received by the sensing surface 4S becomes. Therefore, the sensing-control part 101 determines, based on the intensity of the reflected sensing waves received by the sensing surface 4S, whether the distance between the sensing surface 4S of the sensing device 4 and the surface of the target material OB is above or below a predetermined distance threshold. If this distance is determined to be equal to or less than the predetermined distance threshold, then the sensing-control part 101 outputs, to the storage 107, a control instruction to start the storage of sensed data. On the other hand, if the sensing-control part 101 determines that the distance between the sensing surface 4S of the sensing device 4 and the surface of the target material OB is greater than the distance threshold, then the sensing-control part 101 outputs, to the storage 107, a control instruction to end the storage of sensed data. The distance threshold value is set in advance based upon the characteristics and capabilities of the sensing device 4.

The first sensing operation includes a manual operation in which, by rolling the rollers 3 across the surface of the target material OB, the sensing device 4 is moved across the first area AR1 of the surface of the target material OB. When the embedded-object scanner device 1 approaches the surface of the target material OB at position Pa such that the distance between the sensing surface 4S of the sensing device 4 and the surface of the target material OB becomes the predetermined distance threshold or less and while sensing waves are being emitted from the sensing surface 4S, the storage 107 starts the storage of the sensed data generated by the sensing device 4. After the storage of sensed data in the storage 107 has been started, the sensing device 4 is moved rightward from position Pa toward position Pb while the sensing surface 4S continues to oppose the surface of the target material OB and emit the sensing waves. After the sensing device 4 has reached position Pb, the embedded-object scanner device 1 is separated (pulled away) from the surface of the target material OB at position Pb such that the distance between the sensing surface 4S of the sensing device 4 and the surface of the target material OB becomes greater than the predetermined distance threshold. Therefore, the sensing-control part 101 causes storage 107 to end (terminate) the storage of the sensed data that was generated in the first sensing operation. Therefore, the sensed data generated by the sensing device 4 in (during) the first sensing operation is stored in the storage 107.

After the first sensing operation has been completed, the second sensing operation is then performed. In the second sensing operation the sensing device 4 is moved across the second area AR2 of the surface of the target material OB with the rollers 3 rotating while in contact with the surface of the target material OB. Similar to the first sensing operation, when the embedded-object scanner device 1 approaches the surface of the target material OB at position Pc such that the distance between the sensing surface 4S of the sensing device 4 and the surface of the target material OB is the distance threshold or less and sensing waves are being emitted from the sensing surface 4S, the storage 107 starts the storage of the sensed data generated by the sensing device 4. After the storage of sensed data by the storage 107 has been started, the sensing device 4 is moved rightward from position Pc to position Pd with the sensing surface 4S opposing the surface of the target material OB and emitting sensing waves. After the sensing device 4 has reached position Pd, the embedded-object scanner device 1 is separated (pulled away) from the surface of the target material OB at position Pd such that the distance between the sensing surface 4S of the sensing device 4 and the surface of the target material OB is greater than the distance threshold. Therefore, the sensing-control part 101 causes storage 107 to end the storage of the sensed data generated in the second sensing operation. Therefore, the sensed data generated by the sensing device 4 in the second sensing operation is also stored in the storage 107.

After the second sensing operation has been completed, the third sensing operation is then performed, in which the sensing device 4 is moved across the third area AR3 of the surface of the target material OB with the rollers 3 rotating in contact with the target material OB. Similar to the first and second sensing operations, when the embedded-object scanner device 1 approaches the surface of the target material OB at position Pe such that the distance between the sensing surface 4S of the sensing device 4 and the surface of the target material OB is the distance threshold or less and the sensing waves are being emitted from the sensing surface 4S, the storage 107 starts the storage of the sensed data generated by the sensing device 4. After the storage of sensed data by the storage 107 has been started, the sensing device 4 is moved rightward from position Pe toward position Pf with the sensing surface 4S opposing the surface of the target material OB and emitting sensing waves. After the sensing device 4 has reached position Pf, the embedded-object scanner device 1 is separated (pulled away) from the surface of the target material OB at position Pf such that the distance between the sensing surface 4S of the sensing device 4 and the surface of the target material OB is greater than the distance threshold. Therefore, the sensing-control part 101 causes the storage 107 to end the storage of the sensed data generated in the third sensing operation. Therefore, the sensed data generated by the sensing device 4 in the third sensing operation is also stored in the storage 107.

Figure 12:
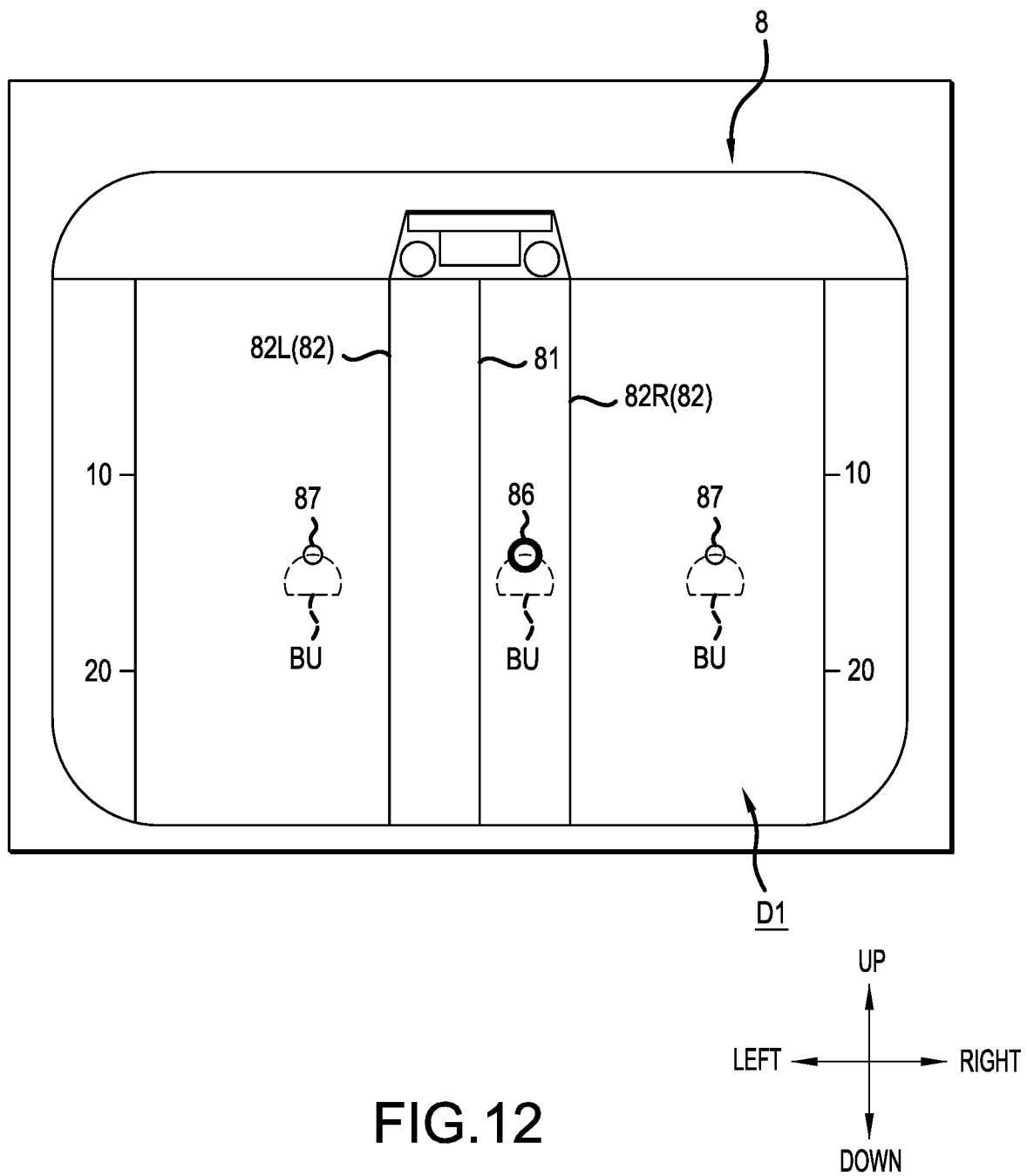
FIG. 12 shows a display example of the display device after a first sensing operation has been performed in the single-scan or multi-scan mode.

FIG. 12 shows another display example of the display device 8, according to the present embodiment, for use after the first sensing operation has been performed. The multiple sensing operations are each performed in the same manner as in the single-scan mode described above.

As was just explained above, when the embedded-object scanner device 1 approaches the surface of the target material OB such that the distance between the sensing surface 4S and the surface of the target material OB at position Pa is the distance threshold or less, the storage of the sensed data of the sensing device 4 by the storage 107 is started, and the first sensing operation is started. In the first sensing operation, the sensing device 4 is moved rightward from position Pa toward position Pb. At the point in time when the sensing device 4 has reached position Pb, display data D1, which includes the images BU of three embedded objects as indicated by one first mark 86 and two second marks 87, is displayed on the display device 8 as shown in FIG. 12.

FIG. 13 shows another display example of the display device 8, in which the images BU shown in FIG. 12 have been moved upward so that additional images BU of embedded objects can be shown on the same display screen. More specifically, in the first sensing operation, when the sensing device 4 has reached position Pb and, at position Pb, when the embedded-object scanner device 1 is separated from the surface of the target material OB such that the distance between the sensing surface 4S and the surface of the target material OB is greater than the distance threshold, the storage 107 ends the storage of the sensed data generated the sensing device 4 in the first sensing operation, such that the sensed data generated in the first sensing operation is stored in the storage 107. The display-control part 105 generates display data D1r based on the sensed data generated in the first sensing operation, which has been stored in the storage 107. The display-control part 105 causes display data D1r to be displayed on the display device 8, as shown in FIG. 13.

Display data D1r corresponds to display data in which display data D1 has been reduced (compressed, shrunk) in the up-down direction. The display-control part 105 causes display data D1r to be displayed in an upper portion of the display screen of the display device 8.

In the present embodiment, by using the information that includes the positions of the embedded objects stored in the storage 107, the display device 8 is configured to show the positions of all embedded objects in the area AR1 detected during the first sensing operation. For example, the outer edges of the display of the display device 8 in FIG. 13 may be used to indicate the boundaries of the area AR1 in the left-right direction. Alternatively, for example, in case the area AR1 is wider than the area that can be displayed on the display device 8, only one of the outer edges of the display of the display device 8 in FIG. 13 may be used to indicate the left or the right boundary of the area AR1. In another example, the area AR1 may be displayed centered with respect to the vertical centerline of the display. In both of these examples, for example, objects that cannot be displayed on the display device 8, because the area AR1 is wider than the area of the display of the display device 8, can be displayed by performing a scrolling operation, which will be described in more detail below.

After display data D1r has been displayed, at position Pc, when the embedded-object scanner device 1 approaches the surface of the target material OB such that the distance between the sensing surface 4S and the surface of the target material OB is the distance threshold or less, storage of the sensed data generated by the sensing device 4 in the storage 107 is started, and the second sensing operation is started. In the second sensing operation, the sensing device 4 is moved rightward from position Pc toward position Pd. At the point in time when the sensing device 4 has reached position Pd, display data D2 (which may also include images BU of the same or other embedded objects with the first or second display indicia (first and second marks 86, 87) is displayed on the display device 8, in a manner similar to FIG. 12.

FIG. 14 shows the first and second sets of sensed data displayed together on the same display screen. More specifically, when the sensing device 4 has reached position Pd in the second sensing operation and the embedded-object scanner device 1 is separated from the surface of the target material OB such that the distance between the sensing surface 4S and the surface of the target material OB at position Pd is greater than the distance threshold, the storage 107 ends the storage of the sensed data generated by the sensing device 4 in the second sensing operation, such that the sensed data generated in the second sensing operation is stored in the storage 107. Then, the display-control part 105 generates display data D2r based on the sensed data generated in the second sensing operation, which is stored in the storage 107. The display-control part 105 displays display data D2r, collectively with display data D1r, on the display device 8.

Display data D2r corresponds to display data in which display data D2 has been reduced (compressed, shrunk) in the up-down direction. The display-control part 105 displays display data D1r and display data D2r such that they are lined up on the display screen of the display device 8. In the example shown in FIG. 14, the display device 8 displays display data D2r below display data D1r.

After display data D1r and display data D2r have been displayed, when the embedded-object scanner device 1 approaches the surface of the target material OB such that the distance between the sensing surface 4S and the surface of the target material OB at position Pe is the distance threshold or less, storage of the sensed data generated by the sensing device 4 in the storage 107 is started, and thus the third sensing operation is started. In the third sensing operation, the sensing device 4 is moved rightward from position Pe toward position Pf. At the point in time when the sensing device 4 has reached position Pf, display data D3 is displayed on the display device 8 again in a manner similar to FIG. 12.

Figure 15:
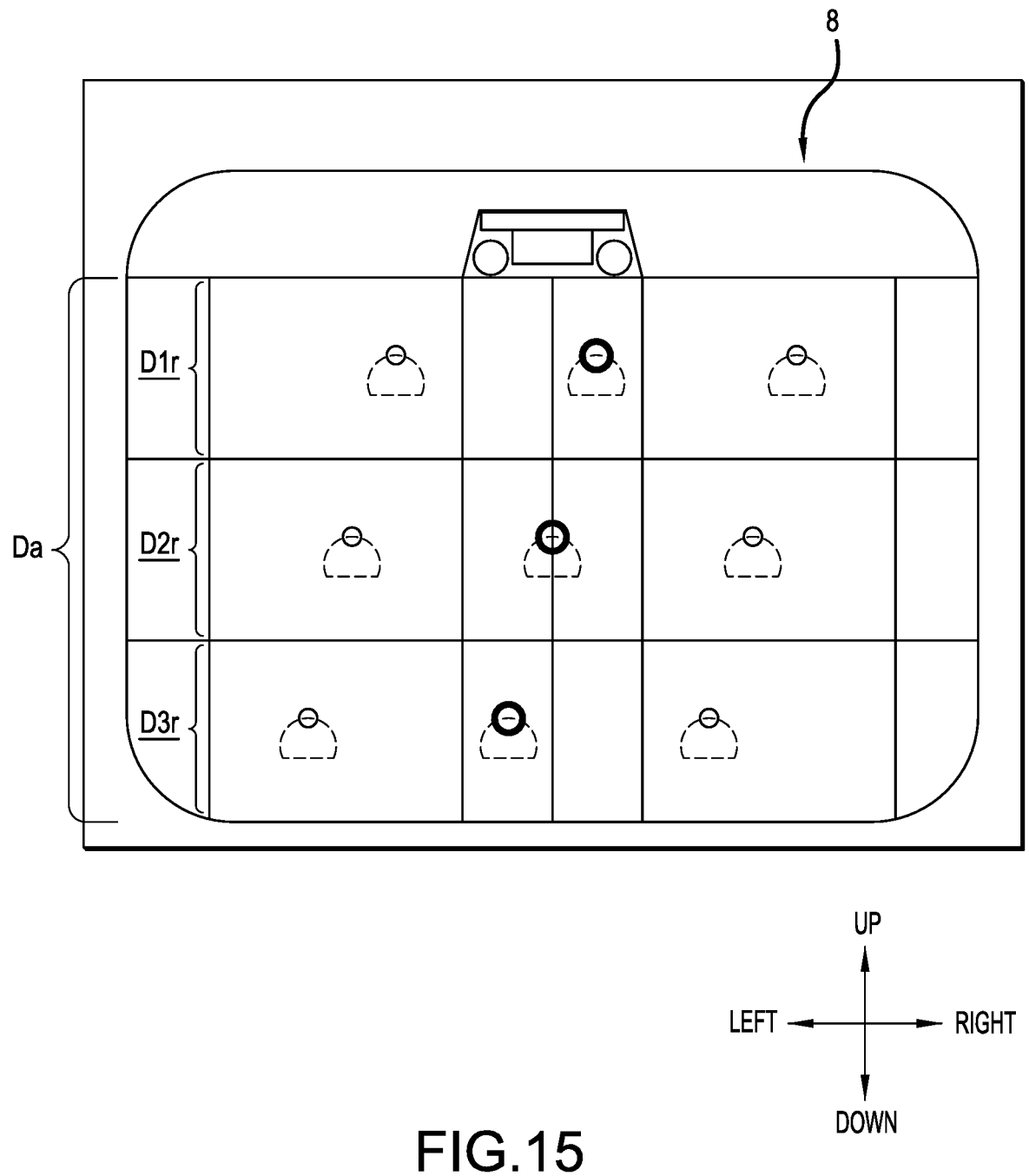
FIG. 15 shows a display example of the display device after a third sensing operation has been performed in the multi-scan mode.

FIG. 15 show the three sets of sensed data displayed together on the display screen. More specifically, in the third sensing operation, when the sensing device 4 has reached position Pf and the embedded-object scanner device 1 is separated from the surface of the target material OB such that the distance between the sensing surface 4S and the surface of the target material OB at position Pf is greater than the distance threshold, the storage 107 ends the storage of the sensed data generated by the sensing device 4 in the third sensing operation such that the sensed data generated in the third sensing operation is stored in the storage 107. The display-control part 105 then generates display data D3r based on the sensed data generated in the third sensing operation, which is stored in the storage 107. The display-control part 105 displays display data D3r, collectively with display data D1r and display data D2r, on the display device 8.

Display data D3r corresponds to display data in which display data D3 has been reduced (compressed, shrunk) in the up-down direction. The display-control part 105 displays display data D1r, display data D2r, and display data D3r such that they are lined up on the display screen of the display device 8. In the example shown in FIG. 15, the display device 8 displays display data D3r below display data D2r.

Thus, in the multi-scan mode, the display device 8 collectively displays the multiple sets of display data D1r, D2r, D3r generated in the multiple sensing operations performed by the sensing device 4. The display device 8 displays the multiple sets of display data D1r, D2r, D3r such that they are lined up. Therefore, the user can view a display of all embedded objects that are present in areas AR1, AR2 and AR3 at the same time, thereby giving the user a better understanding of the locations of the embedded objects over a wider area, than can be achieved in the single-scan mode.

In the present embodiment, the display-control part 105 is also configured to move the multiple sets of display data D1r, D2r, D3r on the display screen of the display device 8 such that the multiple sets of display data D1r, D2r, D3r move across the display screen in a synchronized manner. In the explanation below, the combination of display data D1r, D2r, D3r will be called "aggregated display data Da" where appropriate.

Figure 16:
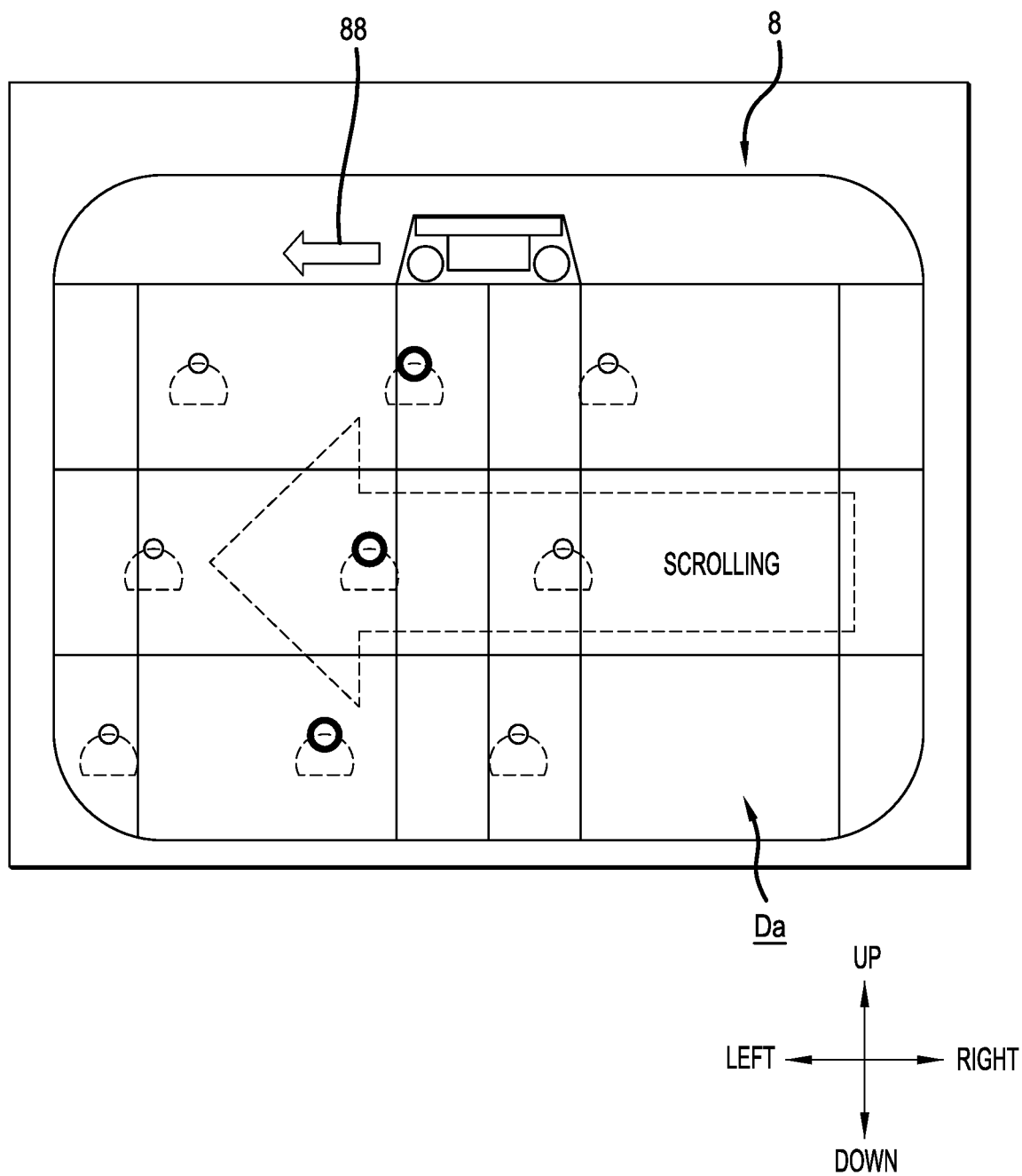
FIG. 16 shows a display example of the display device after the third sensing operation has been performed in the multi-scan mode.

FIG. 16 shows the display image of FIG. 15 in the state of moving across display screen as a result of a scrolling operation. This feature of the present embodiment is achieved in the following manner. The storage 107 stores the multiple sets of display data D1r, D2r, D3r generated in the multiple sensing operations. In addition, the storage 107 stores aggregated display data Da, which is a combination of the multiple sets of display data D1r, D2r, D3r with the images BU of the embedded objects aligned in the same locations that they are present in the target material OB. The display-control part 105 can move the aggregated display data Da in the left-right direction on the display screen of the display device 8 based on aggregated display data Da stored in the storage 107. That is, the display-control part 105 can scroll the aggregated display data Da in the left-right direction, in order to show a wider area of the target material OB than may be possible to view in one single image on the display screen. In addition, the display-control part 105 can display, on the display device 8, an icon 88 that indicates that scrolling of the aggregated display data Da is in progress. In the example shown in FIG. 16, the icon 88 includes an arrow that indicates the scrolling direction of the aggregated display data Da.

In the present embodiment, the display-control part 105 causes the aggregated display data Da to move in the left-right direction synchronized with rotation of the rollers 3. That is, if the user wishes to scroll the aggregated display data Da, then the user moves the housing 2 in the left-right direction while the rollers 3 are in contact with the surface of the target material OB. The rotation sensor 30 detects the rotation of the rollers 3; more particularly, the rotation sensor 30 senses the rotational speed and direction of the rollers 3. The display-control part 105 moves the aggregated display data Da in the left-right direction in accordance with the sensed data (rotational speed and direction) generated by the rotation sensor 30.

Because the rotation sensor 30 is configured to detect the rotational angle of the rollers 3 and the rotational direction of the rollers 3, the display-control part 105 can adjust the scrolling of the aggregated display data Da based on the movement distance of the rollers 3, which is calculated from the rotational angle of the rollers 3 sensed by the rotation sensor 30. The display-control part 105 adjusts the scrolling direction of the aggregated display data Da based on the rotational direction of the rollers 3. More specifically, if the rollers 3 are moving leftward, then the display-control part 105 scrolls the aggregated display data Da leftward; on the other hand, if the rollers 3 are moving rightward, then the display-control part 105 scrolls the aggregated display data Da rightward. If the user wishes to increase the scrolling speed of the aggregated display data Da, then, with the rollers 3 contacting the surface of the target material OB, the user moves the housing 2 at a higher speed in the left-right direction. On the other hand, if the user wishes to decrease the scrolling speed of the aggregated display data Da, then, with the rollers 3 contacting the surface of the target material OB, the user moves the housing 2 at a lower speed in the left-right direction. If the user wishes to scroll then aggregated display data Da leftward, then the user moves the housing 2 leftward while rolling the rollers 3 along the surface of the target material OB. If the user wishes to scroll the aggregated display data Da rightward, then the user moves the housing 2 rightward while rolling the rollers 3 along the surface of the target material OB.

The display-control part 105 displays, on the display device 8, display data for the rotational speed of the rollers 3 based on the rotational speed of the rollers 3, which is calculated from the rotational angle of the rollers 3 sensed by the rotation sensor 30. If the sensed rotational speed of the rollers 3 becomes a predetermined speed or higher, then the display-control part 105 displays, on the display device 8, display data that indicates that the rotational speed of the rollers 3 is the predetermined speed or higher. By checking this display data, the user can recognize that the movement speed of the embedded-object scanner device 1 is excessively high and can move the embedded-object scanner device 1 at a more appropriate speed.

In addition or in the alternative, if the sensed rotational speed of the rollers 3 becomes the predetermined speed or higher, then the notification-control part 106 may cause the notifying device 12 to operate. More specifically, the notification-control part 106 may cause a sound, which indicates that the rotational speed of the rollers 3 is the predetermined speed or higher, to be output from the audio-output device. In addition or in the alternative, the notification-control part 106 may cause the light-emitting device to operate in the light-emitting state, which indicates that the rotational speed of the rollers 3 is the predetermined speed or higher. By actuating the notifying device 12, the user can be informed that the movement speed of the embedded-object scanner device 1 is excessively high and can move the embedded-object scanner device 1 at a more appropriate speed.

Guidance Parts

Figure 17:
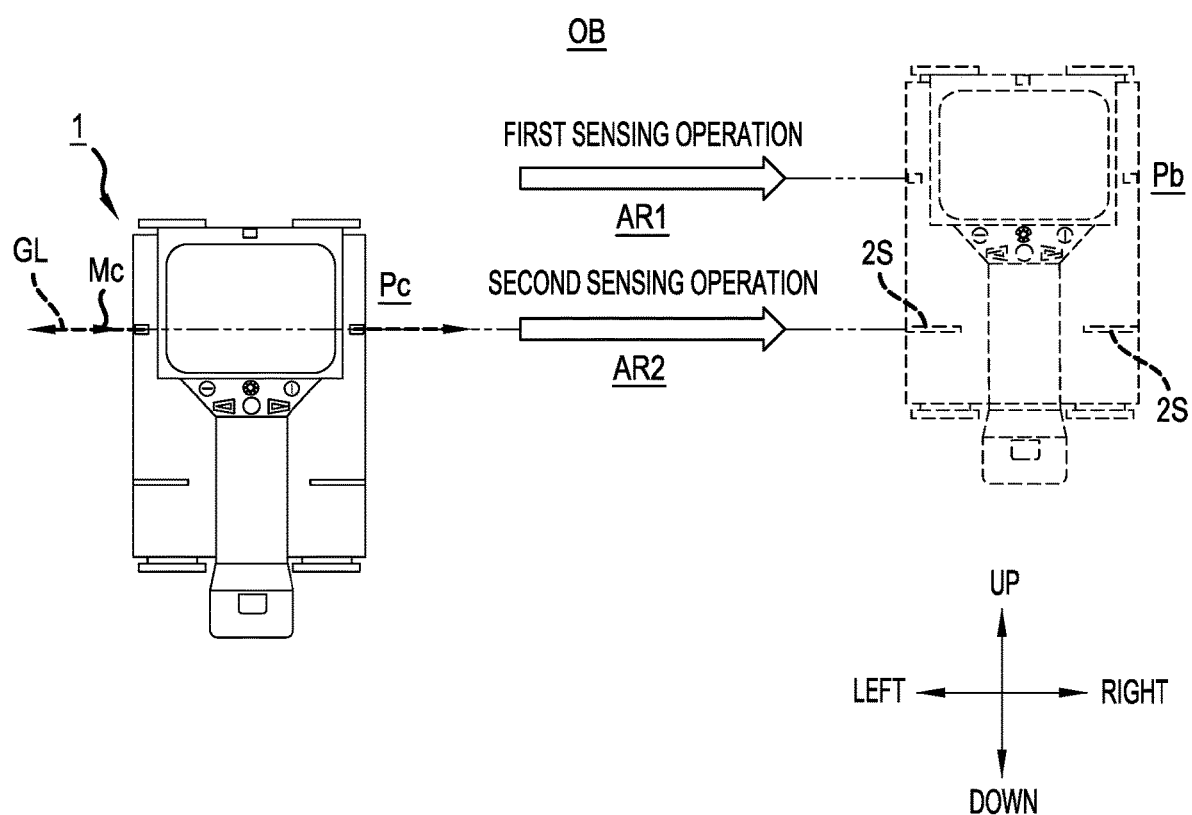
FIG. 17 shows two views for explaining the embedded-object scanner method in the multi-scan mode.

FIG. 17 includes two view for explaining another aspect of the embedded-object scanning method, according to the present embodiment, in the multi-scan mode. More specifically, FIG. 17 shows the two guidance parts 2S that are respectively provided on/in the housing 2 on the left and right sides thereof. The guidance parts 2S may include slits, which are provided in (extend into) the housing 2, or the guidance parts 2S may be provided as marks (lines) that are provided (drawn, printed) on the surface of the housing 2.

Figure 11:
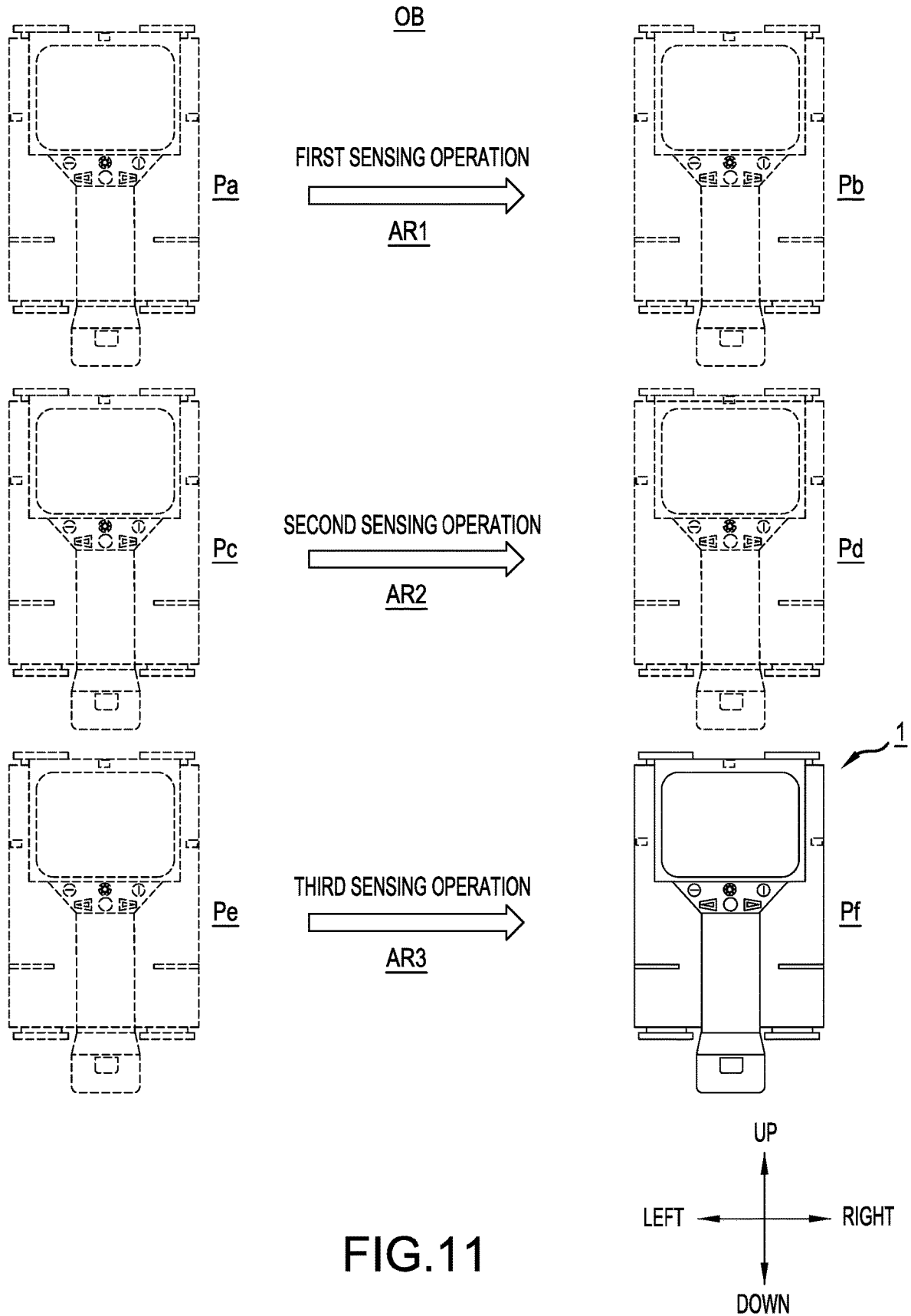
FIG. 11 contains three views for explaining the embedded-object scanning method, which utilizes the embodiment of FIG. 1 in a multi-scan mode.

The guidance parts 2S may be used by the user to guide the position of the housing 2 in the up-down direction when detecting the first area AR1 and the second area AR2, which are defined in the up-down direction as shown in FIG. 11, using the sensing device 4. The distance between the first area AR1 and the second area AR2 in the up-down direction can thus be set to a prescribed value by using the guidance parts 2S as will be described below.

As shown in FIG. 17, before the first sensing operation is performed, a mark Mc is applied, using the left side guidance part 2S as an indicator, to the surface of the target material OB. The mark Mc indicates the position of the guidance parts 2S in the up-down direction. After the mark Mc has been applied to the target material OB and before the second sensing operation is performed, the position of the housing 2 is adjusted (moved downward) such that the positions of laser lights GL coincides with the position of the mark Mc, which was applied before the first sensing operation was performed, in the up-down direction. Thus, after the first sensing operation is completed by moving the device 1 rightward to the position shown in dotted lines in FIG. 17, the housing 2 can then be moved downward from the position (level) of the first sensing operation by the distance between the guidance parts 2S and laser lights GL to the position shown in solid lines in FIG. 17. Thus, when the positions of laser lights GL coincide with the position of the mark Mc, the second sensing operation is performed. In this way, the distance between the first area AR1 and the second area AR2 in the up-down direction is made to be equal to the distance between the guidance parts 2S and laser lights GL in the up-down direction.

Although not shown in FIG. 17, before the second sensing operation is performed while the positions of laser lights GL coincides with the position of the mark Mc, another mark may be applied to the surface of the target material OB using the left-side guidance part 2S as an indicator. Therefore, before the third sensing operation is performed, the position of the housing 2 is adjusted (moved downward) such that the positions of laser lights GL coincides with the position of the second mark (not shown), which was applied before the second sensing operation was performed, in the up-down direction. Again, the housing 2 can thus be moved downward from the position (level) in the second sensing operation by the distance between the guidance parts 2S and laser lights GL in the up-down direction. Thereafter, with the positions of laser lights GL coinciding with the position of the mark Mc, the third sensing operation is performed by moving the device 1 rightward from the second mark (not shown). In the up-down direction, the distance between the second area AR2 and the third area AR3 is again made to equal to the distance between the guidance parts 2S and laser lights GL in the up-down direction.

Thus, by using the guidance parts 2S, the distance between the first area AR1 and the second area AR2 in the up-down direction and the distance between the second area AR2 and the third area AR3 can be made to be the same distance, so that all of the areas AR1, AR2 and AR3 have the same height.

Advantages and Effects

According to the present embodiment as explained above, the embedded-object scanner device 1, e.g., comprises the display device 8, which collectively displays multiple sets of display data D1r, D2r, D3r generated in multiple sensing operations performed by the sensing device 4. Therefore, the user can efficiently check, based on display data D1r, D2r, D3r displayed on the display device 8, all of the sensed data generated by the sensing device 4 generated by the multiple sensing operations in one display image, thereby making the scanning results easier to review and understand.

Furthermore, because the display device 8 displays the multiple sets of display data D1r, D2r, D3r lined up in the same spatial arrangement as the embedded objects in the target material OB, the user can easily confirm the positions and shapes of the embedded objects over a wider area than is possible in a single-scan mode. For example, as shown in FIG. 15, if the positions of images BU of the embedded objects in the left-right direction differ among multiple sets of display data D1r, D2r, D3r, then the user can confirm, based on display data D1r, D2r, D3r displayed on the display device 8, that the embedded objects are arrayed (disposed) in an arrangement that is tilted relative to the vertical (up-down) direction).

Owing to the provision of the guidance parts 2S, the distance between (the heights of) the first area AR1 and the second area AR2 in the up-down direction can be set to a prescribed value as was explained with reference to FIG. 17.

Furthermore, as was explained with reference to FIG. 16, the display device 8 moves the multiple sets of display data D1r, D2r, D3r on the display screen in a synchronized manner when the device 1 is scrolled across a surface. Thereby, the user can easily recheck the state (the locations) of embedded objects. In addition, the user can confirm the state (the locations) of embedded objects over a wide area.

The display device 8 can move display data D1r, D2r, D3r synchronized with the rotation of the rollers 3. Thereby, the user can scroll display data D1r, D2r, D3r merely by rolling the rollers 3 across a surface.

Other Embodiments

In the embodiment described above, the multiple sets of display data D1r, D2r, D3r are displayed such that they are lined up in the up-down direction. However, in a modified embodiment according to the present teachings, the multiple sets of display data D1r, D2r, D3r may be displayed such that they are lined up in the left-right direction. In addition or in the alternative, the multiple sets of display data D1r, D2r, D3r may be displayed such that they overlap.

In the embodiment described above, the first area AR1, the second area AR2, and the third area AR3 are arranged in the up-down direction. However, in a modified embodiment according to the present teachings, the first area AR1, the second area AR2, and the third area AR3 may be arranged in the left-right direction.

In the embodiment described above, the first area AR1, the second area AR2, and the third area AR3 are different areas, i.e. different portions of the surface of the target material OB. However, in a modified embodiment according to the present teachings, the first area AR1 and the second area AR2 detected in multiple sensing operations may be the identical (same) area. That is, the user may use the embedded-object scanner device 1 to scan for embedded objects any number of times across the same area of the surface of the target material OB. The display device 8 may collectively display the multiple sets of display data generated in multiple sensing operations performed across the same area.

In the embodiment described above, the sensed data acquired by the first sensing operation and the sensed data acquired by the second sensing operation may be arithmetically processed, and the display-control part 105 may display, on the display device 8, display data that shows the sensed data after it has been arithmetically processed.

In the embodiment described above, the guidance parts 2S may include gradations. In addition or in the alternative, the guidance parts 2S may include emitting (illumination) parts that emit, for example, laser light.

In the embodiment described above, the display device 8 scrolls the display data synchronized with the rotation of the rollers 3. However, in a modified embodiment according to the present teachings, the display device 8 may scroll the display data based on a manual operation signal generated by the manual-operation device 7, e.g., by pressing the left and right MOVE buttons 74L, 74R.

In the embodiment described above, the timing of the start of storage of the sensed data by the storage 107 and the timing of the end of storage of the sensed data by the storage 107 are determined based on the distance between the sensing surface 4S of the sensing device 4 and the surface of the target material OB. However, in a modified embodiment according to the present teachings, the timing of the start of storage of the sensed data by the storage 107 and the timing of the end of storage of the sensed data by the storage 107 may be determined based on a manual operation signal generated by the manual-operation device 7, e.g., by pressing START and STOP buttons (not shown) on the manual-operation device 7 or on the display device 8 (in case the display device 8 is a touchscreen). In addition or in the alternative, the timing of the start of storage of the sensed data by the storage 107 and the timing of the end of storage of the sensed data by the storage 107 may be determined based on the sensed data generated the rotation sensor 30. For example, when the rotation of the rollers 3 has started in a sensing operation, the storage of the sensed data by the storage 107 may be started; and when the rotation of the rollers 3 in a sensing operation has ended, the storage of the sensed data by the storage 107 may be ended.

Additional aspects of the present teachings include, but are not limited to:

1. An embedded-object scanner device (wall scanner) comprising:
a housing;
a sensing device, which is housed in the housing and senses one or more embedded objects embedded in a target material; and
one or more illumination provided on the housing for illuminating at least a portion of the surface of the target material.

2. The embedded-object scanner device according to the above aspect 1, wherein:
the sensing device senses, while being moved in a left-right direction, the surface of the target material; and
the illumination device(s) include(s) one or more illumination-light-emitting parts that emit(s) illumination light in the left-right direction.

3. The embedded-object scanner device according to the above aspect 2, wherein:
the sensing device has a sensing surface that faces the target material; and
the position(s) of the illumination-light-emitting part(s) at least substantially coincide(s) with the position of the center of the sensing surface in an up-down direction.

4. The embedded-object scanner device according to any one of aspects 1-3, wherein:
the sensing device senses, while being moved in a left-right direction, the surface of the target material; and
the illumination device(s) include(s) one or more illumination-light-emitting parts that emit(s) illumination light in an up-down direction that is perpendicular to a (the) left-right direction.

5. The embedded-object scanner device according to the above aspect 4, wherein:
the sensing device has a sensing surface that faces the target material; and
the position(s) of the illumination-light-emitting part(s) at least substantially coincide(s) with the position of the center of the sensing surface in the left-right direction.

6. The embedded-object scanner device according to any one of the above aspects 1-5, wherein the illumination device(s) include(s) illumination-light-emitting parts respectively provided on each of a left side surface, a right side surface and an upper surface of the housing.

7. The embedded-object scanner device according to any one of the above aspects 1-6, wherein the sensing device has a sensing surface that faces the target material and is equipped with one or more indicator devices that indicate(s) the position of the sensing device.

8. The embedded-object scanner device according to the above aspect 7, wherein:
the sensing device senses, while being moved in a (the) left-right direction, the surface of the target material; and
the indicator device(s) indicate(s) the position of the center of the sensing surface in an up-down direction.

9. The embedded-object scanner device according to the above aspect 7 or 8, wherein:
the indicator device(s) comprise(s) a laser-light emitting part or laser-light emitting parts that emit(s) laser light in a (the) left-right direction; and
the position(s) of the laser-light emitting part(s) at least substantially coincide(s) with the position of the center of the sensing surface in a (the) up-down direction.

10. The embedded-object scanner device according to the above aspect 9, wherein:
the laser-light emitting part(s) is (are) provided on an outer surface of the housing; and
a distance between the center of the housing and the laser-light emitting part(s) is shorter than a distance between the center of the housing and an edge of the housing in the left-right direction.

11. The embedded-object scanner device according to any one of the above aspects 1-10, comprising:
a display device;
wherein:
the sensing device senses, while being moved in a (the) left-right direction, the surface of the target material; and
the display device displays one or more images of one or more embedded object(s) present between the center of the housing and edge parts of the housing in the left-right direction using a first display indicia, and displays the embedded object(s) present outward of the housing using a second display indicia.

12. The embedded-object scanner device according to the above aspect 11, wherein the display device:
displays a center line indicating the center of the housing in the left-right direction and edge lines that indicate the edges of the housing on both sides of the center line, and
displays the image(s) of the embedded object(s) between the edge lines using the first display indicia.

13. The embedded-object scanner device according to any one of the above aspects 1-12, comprising:
a manual-operation device that generates manual-operation signals for at least the illumination device(s).

14. The embedded-object scanner device according to the above aspect 13, wherein the manual-operation signals include a start signal for starting (turning ON) the illumination device(s) or a stop signal for stopping (turning OFF) the illumination device(s).

15. The embedded-object scanner device according to the above aspect 13 or 14, wherein the manual-operation signals include a light-intensity adjustment signal that adjusts the intensity of the light emitted from the illumination device(s).

16. The embedded-object scanner device according to any one of the above aspects 1-15, comprising a battery-mounting part, on which a battery for a power tool is mounted.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved embedded-object scanner devices (wall scanners) and methods of using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block, part or component of a device, such as the control device (controller, processor) 10 is also understood as a corresponding method step or as a feature of a method step. In an analogous manner, aspects which have been described in the context of or as a method step also represent a description of a corresponding block or detail or feature of a corresponding device, such as the control device.

Depending on certain implementation requirements, exemplary embodiments of the control device 10 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals that are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control device 10, are implemented as a program, firmware, computer program, or computer program product including a program, or as data, wherein the program code or the data is operative to perform one of the methods when the program is executed by a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the device 1.

Therefore, although some aspects of the control device have been identified as "parts" or "units" or "steps", it is understood that such parts or units or steps need not be physically separate or distinct electrical components, but rather may be different blocks of program code that are executed by the same hardware component, e.g., one or more microprocessors.

One representative, non-limiting algorithm for operating the device 1, which algorithm may be stored in and executed by the control device 10, may include the steps of: (i) initiating a sensing operation by causing a sensing device 4 to emit sensing waves, (ii) receiving reflected sensing waves and outputting sensed data representative of the reflected sensing waves from the sensing device 4, (iii) storing the sensed data in a memory (storage) location, (iv) repeating steps (i)-(iii) one or more times to collect and store additional sets of sensed data, e.g., from the same or different areas of a target material (OB), (v) processing the plurality of sets of sensed data, e.g., either at the time of capturing each set of sensed data or at the end of capturing all sets of sensed data, to identify one or more embedded objects in the plurality of sets of sensed data, (vi) optionally marking the embedded object(s) with first or second display indicia based on the location(s) of the embedded object(s), e.g., relative to the sensing device 4, (vii) optionally compressing or shrinking the plurality of sets of sensed data in one spatial direction (e.g., an up-down direction, a left-right direction, etc.), (viii) correlating the plurality of sets of sensed data in the one spatial direction so that the plurality of sets of sensed data are displayable in an aligned arrangement in the one spatial direction, and (ix) displaying the plurality of sets of sensed data on a display screen in the aligned arrangement in the one spatial direction.

Optionally, the representative, non-limiting algorithm may further include: (x) receiving rotational sensor data from a rotation sensor 30 that senses rotational direction and speed of one or more rollers 3 of the device 1, (xi) processing the rotational sensor data to determine the speed and direction of movement of the device 1 in the one spatial direction and (xii) scrolling the image of the displayed plurality of sets of sensed data in the aligned arrangement on the display screen in the determined direction of movement in the one spatial direction and in proportion to the detected rotational speed of the roller(s) 3.

EXPLANATION OF THE REFERENCE NUMBERS

1 Embedded-object scanner device
2 Housing

2A Upper surface
2B Lower surface
2C Left-side surface
2D Right-side surface
2E Front surface
2F Rear surface
2H Handle
2S Guidance part
3 Roller
4 Sensing device
4S Sensing surface
5 Illumination device
6 Indicator device
7 Manual-operation device
8 Display device
9 Battery-mounting part
9G Guide rail
10 Control device
11 Battery
11B Release button
11G Slide rail
12 Notifying device
30 Rotation sensor
51 Illumination-light-emitting part
51L Left illumination-light-emitting part
51R Right illumination-light-emitting part
52 Illumination-light-emitting part
61 Laser-light emitting part
61L Left laser-light-emitting part
61R Right laser-light-emitting part
71 POWER button
72 SETTINGS button
73 MENU button
74 MOVE button
74L MOVE LEFT button
74R MOVE RIGHT button
75 ENTER button
81 Centerline
82 Edge-part line
82L Left edge line
82R Right edge line
83 Surface line
84 Depth line
85 Icon
86 First mark
87 Second mark
88 Icon
101 Sensing-control part
102 Sensed-data acquiring part
103 Illumination-control part
104 Indicator-control part
105 Display-control part
106 Notification-control part
107 Storage
AR1 First area
AR2 Second area
AR3 Third area
AX Rotational axis
BU Image
D1 Display data
D1r Display data
D2r Display data
D3r Display data
Da Aggregated display data
Fa Selection frame
Fb Selection frame
Fc Selection frame
Fd Selection frame
GL Laser light
IL Illumination light
Ma Mark
Mb Mark
Mc Mark
OB Target Material
Pa Position
Pb Position
Pc Position
Pd Position
Pe Position
Pf Position

The invention claimed is:

1. An embedded-object scanner device, comprising:
a housing;
a sensing device housed in the housing and configured to sense one or more embedded objects embedded in a target material; and
a display device provided on the housing, the display device being configured to collectively display at least first and second sets of display data (D1r, D2r, D3r) respectively generated in at least first and second sensing scans performed by the sensing device, the second sensing scan being initiated and performed after completion of the first sensing scan;
wherein:
the first set of display data (D1r) comprises first image display data generated by the sensing device scanning a first area (AR1) of the target material, the first image display data including any embedded object(s) in the first area (AR1) of the target material,
the second set of display data (D2r) comprises second image display data generated by the sensing device scanning a second area (AR2) of the target material that differs from the first area (AR1), the second image display data including any embedded object(s) in the second area (AR2) of the target material, and
the display device is configured to simultaneously display a first image corresponding to the first image display data adjacent to a second image corresponding to the second image display data.

2. The embedded-object scanner device according to claim 1, wherein the display device is configured to simultaneously display the first and second images corresponding to the at least first and second sets of display data in an aligned state.

3. The embedded-object scanner device according to claim 1, wherein:
the sensing device is configured to sense, while being moved in a left-right direction, a surface of the target material; and
the at least first and second sensing scans respectively comprise first manually moving the embedded-object scanner device in the left-right direction across the first area of the surface of the target material and then subsequently manually moving the embedded-object scanner device in the left-right direction across the second area of the surface of the target material.

4. The embedded-object scanner device according to claim 3, wherein the at least first and second sensing scans include:
a first sensing scan that comprises manually moving the sensing device in the left-right direction across the first area (AR1) of the surface of the target material, and
a second sensing scan that comprises manually moving the sensing device in the left-right direction across the second area (AR2) of the surface of the target material, the second sensing scan being performed subsequent to completion of the first sensing scan.

5. The embedded-object scanner device according to claim 4, wherein the first area and the second area are defined in an up-down direction and are non-overlapping.

6. The embedded-object scanner device according to claim 5, further comprising a guidance part disposed on the housing and configured to serve as a guide for the position of the housing in the up-down direction.

7. The embedded-object scanner device according to claim 1, wherein the display device is configured to scroll the first and second images of the at least first and second sets of display data (D1r, D2r, D3r) across a display screen in a synchronized manner.

8. The embedded-object scanner device according to claim 7, further comprising:
rollers rotatably mounted on the housing and configured to rotate in response to the rollers contacting a surface of the target material and the embedded-object scanner device being moved across the surface of the target material;
wherein the display device is configured to scroll the first and second images of the at least first and second sets of display data (D1r, D2r, D3r) across the display screen synchronized with rotation of the rollers.

9. The embedded-object scanner device according to claim 8, wherein each of the sensing scans comprises manually moving the sensing device across the surface of the target material while rotating the rollers.

10. The embedded-object scanner device according to claim 1, further comprising:
a control device configured to output control instructions for starting and terminating of each of the at least first and second sensing scans; and
a storage that stores sensed data generated by the sensing device based on the control instructions.

11. The embedded-object scanner device according to claim 10, wherein the control device is configured to output the control instructions based on a detected distance between the sensing device and a surface of the target material.

12. The embedded-object scanner device according to claim 1, further comprising:
a battery-mounting part on the housing, and
a battery for a power tool mounted on the battery-mounting part.

13. The embedded-object scanner device according to claim 12, further comprising:
a control device configured to output control instructions for starting and terminating of each of the at least first and second sensing scans; and
a storage that stores sensed data generated by the sensing device based on the control instructions.

14. The embedded-object scanner device according to claim 13, wherein the control device is configured to output the control instructions based on a detected distance between the sensing device and a surface of the target material.

15. The embedded-object scanner device according to claim 14, wherein:
the display device is configured to simultaneously display the first and second images corresponding to the at least first and second sets of display data in an aligned state; and
the sensing device is configured to sense, while being moved in a first linear direction across the surface of the target material, embedded objects underneath the surface of the target material.

16. The embedded-object scanner device according to claim 15, wherein the control device and storage are configured to collect and store sensed data from at least:
a first sensing scan that comprises manually moving the sensing device in the first linear direction across the first area (AR1) of the surface of the target material, and
a second sensing scan that comprises manually moving the sensing device in the first linear direction across the second area (AR1) of the surface of the target material; and
wherein:
the first area and the second area are non-overlapping in a second linear direction that is perpendicular to the first linear direction; and
the second sensing scan is performed subsequent to completion of the first sensing scan.

17. The embedded-object scanner device according to claim 16, further comprising a guidance part disposed on the housing and configured to serve as a guide for the position of the housing in the second linear direction.

18. The embedded-object scanner device according to claim 1, further comprising:
rollers rotatably mounted on the housing and configured to rotate in response to the rollers contacting a surface of the target material and the embedded-object scanner device being moved across the surface of the target material; and
a rotation sensor configured to detect a rotational direction and a rotational speed of at least one of the rollers;
wherein:
each of the sensing scans comprises manually moving the sensing device across the surface of the target material while rotating the rollers, and
the at least first and second sets of display data are generated based at least in part on (i) sensed data generated by the sensing device and (ii) sensed data generated by the rotation sensor in the at least first and second sensing scans.

19. A wall scanner, comprising:
a housing;
a radar device housed in the housing, the radar device being configured to: (i) emit radio waves, (ii) receive radio waves reflected from embedded objects underneath a surface of a target material and (iii) output sensed data representative of the received reflected radio waves;
a controller configured to: (i) process the sensed data to identify embedded objects underneath the surface of the target material, and (ii) store at least two sets of display data concerning shapes and locations of the identified embedded object(s) generated in at least first and second sensing scans of different surface areas of the target material, the second sensing scan being initiated and performed after completion of the first sensing scan; and
a display provided on the housing, the controller and display being configured to collectively and simultaneously display images corresponding to the at least two sets of display data (D1r, D2r, D3r) generated in the at least two sensing scans in a single display image.

20. A method for scanning for one or more embedded objects underneath a surface of a target material, comprising:
(i) emitting sensing waves from a wall scanner towards the target material while manually moving the wall scanner across a first area of the surface of the target material;

(ii) receiving reflected sensing waves in the wall scanner;
(iii) processing the reflected sensing waves in the wall scanner to identify shapes and locations of any embedded object(s) underneath the first area of the surface of the target material;
(iv) storing, in the wall scanner, first display data concerning the identified shapes and locations of the embedded object(s), if any, underneath the first area of the surface of the target material;
(v) after completing steps (i)-(iv), repeating steps (i)-(iv) across a second area of the surface of the target material that differs from the first area of the surface of the target material to generate second display data concerning the identified shapes and locations of any embedded object(s) underneath the second area of the surface of the target material; and
(vi) collectively and simultaneously displaying first and second images respectively corresponding to the first and second display data for the first and second areas of the surface of the target material in a single display image on a display of the wall scanner, the first and second images including the embedded object(s), if any, identified in the first and second areas.

21. An embedded-object scanner device, comprising:
a housing;
a sensing device housed in the housing and configured to sense one or more embedded objects embedded in a target material;
rollers rotatably mounted on the housing and configured to rotate in response to the rollers contacting a surface of the target material and the embedded-object scanner device being moved across the surface of the target material; and
a rotation sensor configured to detect a rotational direction and a rotational speed of at least one of the rollers; and
a display device provided on the housing, the display device being configured to collectively display multiple sets of display data ($D1r$, $D2r$, $D3r$) generated in multiple sensing operations performed by the sensing device;
wherein:
each of the sensing operations comprises manually moving the sensing device across the surface of the target material while rotating the rollers, and
the multiple sets of display data are generated based at least in part on (i) sensed data generated by the sensing device and (ii) sensed data generated by the rotation sensor in the multiple sensing operations.

* * * * *